United States Patent
Dhori et al.

(10) Patent No.: US 12,469,545 B2
(45) Date of Patent: Nov. 11, 2025

(54) BIT LINE READ CURRENT MIRRORING CIRCUIT FOR AN IN-MEMORY COMPUTE OPERATION WHERE SIMULTANEOUS ACCESS IS MADE TO PLURAL ROWS OF A STATIC RANDOM ACCESS MEMORY (SRAM)

(71) Applicant: STMicroelectronics International N.V., Geneva (CH)

(72) Inventors: Kedar Janardan Dhori, Ghaziabad (IN); Promod Kumar, Greater Noida (IN); Nitin Chawla, Noida (IN); Harsh Rawat, Faridabad (IN); Manuj Ayodhyawasi, Noida (IN)

(73) Assignee: STMicroelectronics International N.V., Geneva (CH)

( * ) Notice: Subject to any disclaimer, the term of this patent is extended or adjusted under 35 U.S.C. 154(b) by 256 days.

(21) Appl. No.: 18/137,261

(22) Filed: Apr. 20, 2023

(65) Prior Publication Data
US 2023/0410892 A1 Dec. 21, 2023

Related U.S. Application Data

(60) Provisional application No. 63/345,618, filed on May 25, 2022.

(51) Int. Cl.
*G11C 7/04* (2006.01)
*G11C 11/4074* (2006.01)
(Continued)

(52) U.S. Cl.
CPC ...... *G11C 11/4096* (2013.01); *G11C 11/4074* (2013.01); *G11C 11/4085* (2013.01);
(Continued)

(58) Field of Classification Search
CPC ............ G11C 11/4096; G11C 11/4074; G11C 11/4085; G11C 11/4094; G11C 11/418;
(Continued)

(56) References Cited

U.S. PATENT DOCUMENTS

| 5,508,966 A | 4/1996 | Nakase |
| 6,469,929 B1 | 10/2002 | Kushnarenko et al. |

(Continued)

FOREIGN PATENT DOCUMENTS

CN 112071344 A 12/2020

OTHER PUBLICATIONS

English Translation CN112071344 (A) (Year: 2020).*
(Continued)

*Primary Examiner* — Mushfique Siddique
(74) *Attorney, Agent, or Firm* — Crowe & Dunlevy LLC

(57) ABSTRACT

An in-memory computation circuit includes a memory array with SRAM cells connected in rows by word lines and in columns by bit lines. A row controller circuit simultaneously actuates word lines in parallel for an in-memory compute operation. A column processing circuit includes a current mirroring circuit that mirrors the read current developed on each bit line in response to the simultaneous actuation to generate a decision output for the in-memory compute operation. A bias voltage for word line driver and a configuration of the current mirroring circuit to inhibit drop of a voltage on the bit line below a bit flip voltage during execution of the in-memory compute operation. The mirrored read current is integrated by an integration capacitor to generate an output voltage that is converted to a digital signal by an analog-to-digital converter circuit.

42 Claims, 9 Drawing Sheets

(51) Int. Cl.
*G11C 11/408* (2006.01)
*G11C 11/4094* (2006.01)
*G11C 11/4096* (2006.01)
*G11C 11/418* (2006.01)
*G11C 11/419* (2006.01)
*G11C 5/14* (2006.01)
*G11C 8/08* (2006.01)

(52) U.S. Cl.
CPC ........ *G11C 11/4094* (2013.01); *G11C 11/418* (2013.01); *G11C 11/419* (2013.01); *G11C 5/147* (2013.01); *G11C 7/04* (2013.01); *G11C 8/08* (2013.01)

(58) Field of Classification Search
CPC ......... G11C 11/419; G11C 5/147; G11C 7/04; G11C 8/08
See application file for complete search history.

(56) References Cited

U.S. PATENT DOCUMENTS

| | | | |
|---|---|---|---|
| 6,509,595 | B1 | 1/2003 | Leung et al. |
| 7,061,793 | B2 | 6/2006 | Barth, Jr. et al. |
| 7,443,757 | B2 | 10/2008 | Cernea et al. |
| 8,848,426 | B2 | 9/2014 | Azuma et al. |
| 9,001,588 | B2 | 4/2015 | Kim et al. |
| 9,368,224 | B2 | 6/2016 | Wang et al. |
| 9,502,088 | B2 | 11/2016 | Jung et al. |
| 9,665,113 | B2 | 5/2017 | Ciubotaru |
| 11,043,259 | B2* | 6/2021 | Wentzlaff ............... H03K 19/21 |
| 2010/0149887 | A1 | 6/2010 | Takeda |
| 2016/0189769 | A1 | 6/2016 | Jeloka et al. |
| 2017/0301396 | A1* | 10/2017 | Dhori .................... G11C 11/418 |
| 2019/0102359 | A1 | 4/2019 | Knag et al. |
| 2020/0227098 | A1* | 7/2020 | Noel ...................... G11C 29/34 |
| 2021/0294573 | A1 | 9/2021 | Morie et al. |
| 2022/0028444 | A1* | 1/2022 | Papageorgiou .......... G06N 3/08 |
| 2022/0051717 | A1 | 2/2022 | Lee et al. |
| 2022/0068400 | A1 | 3/2022 | Pasotti et al. |
| 2023/0131308 | A1* | 4/2023 | Lee ........................ G11C 7/222 708/603 |

OTHER PUBLICATIONS

X. Si , "24.5 A Twin-8T SRAM Computation-In-Memory Macro for Multiple-Bit CNN-Based Machine Learning," IEEE International Solid-State Circuits Conference (ISSCC), 2019.
Area-Efficient and Variation-Tolerant In-Memory BNN Computing using 6T SRAM Array , Symposium on Circuits VLSI 2019.
X-SRAM: Enabling In-Memory Boolean Computations in CMOS Static Random Access Memories , IEEE Transactions on Circuits and Systems—I: Regular Papers, vol. 65, No. 12, Dec. 2018.
M. Kang et al., "A Multi-Functional In-Memory Inference Processor Using a Standard 6T SRAM Array," IEEE Journal of Solid-State Circuits, vol. 53, No. 2, 2018.
J. Zhang et al., "In-memory computation of a machine-learning classifier in a standard 6T SRAM array," IEEE Journal of Solid-State Circuits, vol. 52, No. 4, 2017.
A. Biswas and A. P. Chandrakasan, "CONV-SRAM: An Energy-Efficient SRAM with In-Memory Dot-Product Computation for Low-Power Convolutional Neural Networks," IEEE Journal of Solid-State Circuits (JSSC), vol. 54, No. 1, 2019.
X. Si et al., "A 28nm 64Kb 6T SRAM Computing-in-Memory Macro with 8b MAC Operation for AI Edge Chips," IEEE International Solid-State Circuits Conference (ISSCC), 2020.
J.-W. Su et al., "A 28nm 64Kb Inference-Training Two-Way Transpose Multibit 6T SRAM Compute-in-Memory Macro for AI Edge Chips," IEEE International Solid-State Circuits Conference (ISSCC), 2020.
S. Yin et al., "XNOR-SRAM: In-Memory Computing SRAM Macro for Binary/Ternary Deep Neural Networks," IEEE Journal of Solid-State Circuits (JSSC), vol. 55, No. 6, 2020.
H. Jia et al., "A Programmable Heterogeneous Microprocessor Based on Bit-Scalable In-Memory Computing," in IEEE Journal of Solid-State Circuits, vol. 55, No. 9, 2020.
Z. Jiang et al., "C3SRAM: An In-Memory-Computing SRAM Macro Based on Robust Capacitive Coupling Computing Mechanism," IEEE Journal of Solid-State Circuits (JSSC), vol. 55, No. 7, 2020.
H. Valavi et al., "A 64-Tile 2.4-Mb In-Memory-Computing CNN Accelerator Employing Charge-Domain Compute," IEEE Journal of Solid-State Circuits, vol. 54, No. 6, 2019.
Q. Dong , "A 351TOPS/W and 372.4GOPS Compute-in-Memory SRAM Macro in 7nm FinFET CMOS for Machine-Learning Applications," IEEE International Solid-State Circuits Conference (ISSCC), 2020.
Jaisawal, Akhilesh, et al: "8T SRAM Cell as a Multibit Dot-Product Engine for Beyond Von Neumann Computing," IEEE Transactions on Very Large Scale Integration (VLSI) Systems, vol. 27, No. 11, Nov. 2019, 12 pages.
EPO Extended Search Report for counterpart EP Appl. No. 23174860, report dated Mar. 19, 2024, 14 pgs.
EPO Search Report and Written Opinion for counterpart EP Appl. No. 23174860.9, report dated Dec. 6, 2023, 15 pgs.

* cited by examiner

BIT LINE READ CURRENT MIRRORING CIRCUIT FOR AN IN-MEMORY COMPUTE OPERATION WHERE SIMULTANEOUS ACCESS IS MADE TO PLURAL ROWS OF A STATIC RANDOM ACCESS MEMORY (SRAM)

CROSS REFERENCE TO RELATED APPLICATIONS

This application claims priority from United States Provisional Application for Patent No. 63/345,618, filed May 25, 2022, the disclosure of which is incorporated herein by reference.

TECHNICAL FIELD

Embodiments relate to an in-memory computation circuit utilizing a static random access memory (SRAM) array and, in particular, to a read circuit that mirrors bit line read current during a simultaneous access of multiple rows of the SRAM array for an in-memory compute operation.

BACKGROUND

Reference is made to FIG. 1 which shows a schematic diagram of an in-memory computation circuit 10. The circuit 10 utilizes a static random access memory (SRAM) array 12 formed by standard 6T SRAM memory cells 14 arranged in a matrix format having N rows and M columns. As an alternative, a standard 8T memory cell or an SRAM with a similar functionality and topology could instead be used. Each memory cell 14 is programmed to store a bit of a computational weight or kernel data for an in-memory compute operation. In this context, the in-memory compute operation is understood to be a form of a high dimensional Matrix Vector Multiplication (MVM) supporting multi-bit weights that are stored in multiple bit cells of the memory. The group of bit cells (in the case of a multibit weight) can be considered as a virtual synaptic element. Each bit of the computational weight has either a logic "1" or a logic "0" value.

Each SRAM cell 14 includes a word line WL and a pair of complementary bit lines BLT and BLC. The 8T-type SRAM cell would additionally include a read word line RWL and a read bit line BLR. The cells 14 in a common row of the matrix are connected to each other through a common word line WL (and through the common read word line RWL in the 8T-type implementation). The cells 14 in a common column of the matrix are connected to each other through a common pair of complementary bit lines BLT and BLC (and through the common read bit line BLR in the 8T-type implementation). Each word line WL, RWL is driven by a word line driver circuit 16 which may be implemented as a CMOS driver circuit (for example, a series connected p-channel and n-channel MOSFET transistor pair forming a logic inverter circuit). The word line signals applied to the word lines, and driven by the word line driver circuits 16, are generated from feature data input to the in-memory computation circuit 10 and controlled by a row controller circuit 18. A column processing circuit 20 senses the analog current signals on the pairs of complementary bit lines BLT and BLC (and/or on the read bit line BLR) for the M columns and generates a decision output for the in-memory compute operation from those analog current signals. The column processing circuit 20 can be implemented to support processing where the analog current signals on the columns are first processed individually and then followed by a recombination of multiple column outputs.

Although not explicitly shown in FIG. 1, it will be understood that the circuit 10 further includes conventional row decode, column decode, and read-write circuits known to those skilled in the art for use in connection with writing bits of the computational weight to, and reading bits of the computational weight from, the SRAM cells 14 of the memory array 12. With reference now to FIG. 2, each memory cell 14 includes two cross-coupled CMOS inverters 22 and 24, each inverter including a series connected p-channel and n-channel MOSFET transistor pair. The inputs and outputs of the inverters 22 and 24 are coupled to form a latch circuit having a true data storage node QT and a complement data storage node QC which store complementary logic states of the stored data bit. The cell 14 further includes two transfer (passgate) transistors 26 and 28 whose gate terminals are driven by a word line WL. The source-drain path of transistor 26 is connected between the true data storage node QT and a node associated with a true bit line BLT. The source-drain path of transistor 28 is connected between the complement data storage node QC and a node associated with a complement bit line BLC. The source terminals of the p-channel transistors 30 and 32 in each inverter 22 and 24 are coupled to receive a high supply voltage (for example, Vdd) at a high supply node, while the source terminals of the n-channel transistors 34 and 36 in each inverter 22 and 24 are coupled to receive a low supply voltage (for example, ground (Gnd) reference) at a low supply node. While FIG. 2 is specific to the use of 6T-type cells, those skilled in the art recognize that the 8T-type cell is similarly configured and would further include a signal path that is coupled to one of the storage nodes and includes a transfer (passgate) transistor coupled to the read bit line BLR and gate driven by the signal on the read word line RWL. The word line driver circuit 16 is also typically coupled to receive the high supply voltage (Vdd) at the high supply node and is referenced to the low supply voltage (Gnd) at the low supply node.

The row controller circuit 18 performs the function of selecting which ones of the word lines WL<0> to WL<N−1> are to be simultaneously accessed (or actuated) in parallel during an in-memory compute operation, and further functions to control application of pulsed signals to the word lines in accordance with the feature data for that in-memory compute operation. FIG. 1 illustrates, by way of example only, the simultaneous actuation of all N word lines with the pulsed word line signals in response to the received feature data, it being understood that in-memory compute operations may instead utilize a simultaneous actuation of fewer than all rows of the SRAM array. The analog signals on a given pair of complementary bit lines BLT and BLC (or on the read bit line RBL in the 8T-type implementation) are dependent on the logic state of the bits of the computational weight stored in the memory cells 14 of the corresponding column and the width(s) of the pulsed word line signals applied to those memory cells 14.

The implementation illustrated in FIG. 1 shows an example in the form of a pulse width modulation (PWM) for the applied word line signals for the in-memory compute operation. The use of PWM or period pulse modulation (PTM) for the applied word line signals is a common technique used for the in-memory compute operation based on the linearity of the vector for the multiply-accumulation (MAC) operation. The pulsed word line signal format can be further evolved as an encoded pulse train to manage block sparsity of the feature data of the in-memory compute operation. It is accordingly recognized that an arbitrary set of encoding schemes for the applied word line signals can be used when simultaneously driving multiple word lines. Furthermore, in a simpler implementation, it will be understood that all applied word line signals in the simultaneous actuation may instead have a same pulse width.

FIG. 3 is a timing diagram showing simultaneous application of the example pulse width modulated word line signals to plural rows of memory cells 14 in the SRAM array 12 for a given in-memory compute operation, and the development over time of voltages Va,T and Va,C on one corresponding pair of complementary bit lines BLT and BLC, respectively, in response to sinking of cell read current ($I_R$) due to the pulse width(s) of those word line signals and the logic state of the bits of the computational weight stored in the memory cells 14. The representation of the voltage Va levels as shown is just an example. After completion of the computation cycle of the in-memory compute operation, the voltage Va levels return to the bit line precharge Vdd level. It will be noted that a risk exists that the voltage on at least one of the bit lines BLT and BLC may fall from the Vdd voltage to a level below the write margin where an unwanted data flip occurs with respect to the stored data bit value in one of the memory cells 14 of the column. For example, a logic "1" state stored in the cell 14 of a column may be flipped to a logic "0" state. This data flip introduces a data error in the computational weight stored in the memory cells, thus jeopardizing the accuracy of subsequent in-memory compute operations.

The unwanted data flip that occurs due to an excess of bit line voltage lowering is mainly an effect of the simultaneous parallel access of the word lines in matrix vector multiplication mode during the in-memory compute operation. This problem is different from normal data flip of an SRAM bit cell due to Static-Noise-Margin (SNM) issues which happens in serial bit cell access when the bit line is close to the level of the supply voltage Vdd. During serial access, the normal data flip is instead caused by a ground bounce of the data storage nodes QT or QC.

A known solution to address the serial bit cell access SNM failure concern is to lower the word line voltage by a small amount and this is generally achieved by a short circuit of the word line driver and the use of a bleeder path. However, parallel access of multiple word lines during an in-memory compute operation instead needs a Radical-WL Lowering/Modulation (RWLM) technique. Additionally, a known solution to address the foregoing problem is to apply a fixed word line voltage lowering (for example, to apply a voltage $V_{WLUD}$ equal to Vdd/2) on all integrated circuit process corners in order to secure the worst integrated circuit process corner. This word line underdrive (WLUD) solution, however, has a known drawback in that there is a corresponding reduction in cell read current ($I_R$) on the bit lines which can have a negative impact on computation performance. Furthermore, the use of a fixed word line underdrive voltage can increase variability of the read current across the array leading to accuracy loss for the in-memory compute operation.

Another solution is to utilize a specialized bitcell circuit design for each memory cell 14 that is less likely to suffer from an unwanted data flip during simultaneous (parallel) access of multiple rows for the in-memory compute operation. A concern with this solution is an increase in occupied circuit area for such a bitcell circuit. It would be preferred for some in-memory computation circuit applications to retain the advantages provided by use of the standard 6T SRAM cell (FIG. 2) or 8T SRAM cell or topologically similar bit cell in the array 12.

SUMMARY

In an embodiment, an in-memory computation circuit comprises: a memory array including a plurality of static random access memory (SRAM) cells arranged in a matrix with plural rows and plural columns, each row including a word line connected to the SRAM cells of the row, and each column including a first bit line connected to the SRAM cells of the column; a word line driver circuit for each row having an output connected to drive the word line of the row, wherein the word line driver circuit is powered by an adaptive supply voltage dependent on integrated circuit process and/or temperature conditions; a row controller circuit configured to simultaneously actuate the plurality of word lines by applying pulses through the word line driver circuits to the word lines for an in-memory compute operation; and a column processing circuit including a first read circuit coupled to each first bit line.

Each first read circuit comprises: a first current mirroring circuit configured to mirror a first read current on the first bit line to generate a first mirrored read current; and a first integration capacitor configured to integrate the first mirrored read current to generate a first output voltage. The adaptive supply voltage and configuration of the first current mirroring circuit inhibit drop of a voltage on the first bit line below a bit flip voltage during the simultaneous actuation of the plurality of word lines for the in-memory compute operation.

In an embodiment, an in-memory computation circuit comprises: a memory array including a plurality of static random access memory (SRAM) cells arranged in a matrix with plural rows and first and second columns, each row including a word line connected to the SRAM cells of the row, and each of the first and second columns including a first bit line connected to the SRAM cells of the column; a word line driver circuit for each row having an output connected to drive the word line of the row, wherein the word line driver circuit is powered by an adaptive supply voltage dependent on integrated circuit process and/or temperature conditions; a row controller circuit configured to simultaneously actuate the plurality of word lines by applying pulses through the word line driver circuits to the word lines for an in-memory compute operation; and a column processing circuit.

The column processing circuit includes: a first read circuit with a first current mirroring ratio coupled to the first bit line of the first column, said first read circuit including a first current mirroring circuit configured to mirror a first read current on the first bit line of the first column to generate a first mirrored read current; wherein the adaptive supply voltage and configuration of the first current mirroring circuit inhibits drop of a voltage on the first bit line of the first column below a bit flip voltage during the simultaneous actuation of the plurality of word lines for the in-memory compute operation; a second read circuit with a second current mirroring ratio coupled to the first bit line of the second column, said second read circuit including a second current mirroring circuit configured to mirror a second read current on the first bit line of the second column to generate a second mirrored read current; wherein the adaptive supply voltage and configuration of the second current mirroring circuit inhibits drop of a voltage on the first bit line of the second column below the bit flip voltage during the simultaneous actuation of the plurality of word lines for the in-memory compute operation; and a first integration capacitor configured to integrate a sum of the first and second mirrored read currents to generate a first output voltage

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
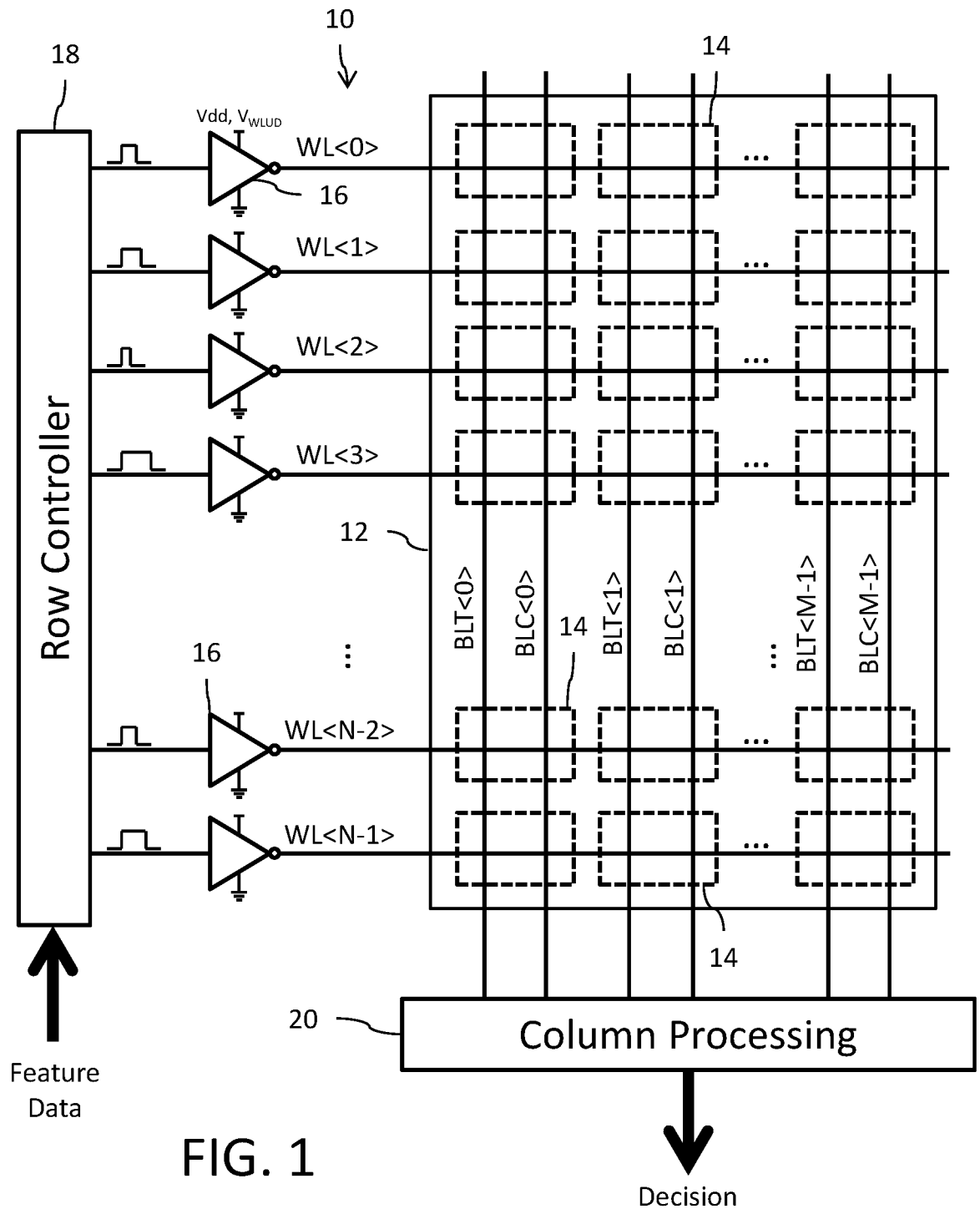
FIG. 1 is a schematic diagram of an in-memory computation circuit.
Figure 2:
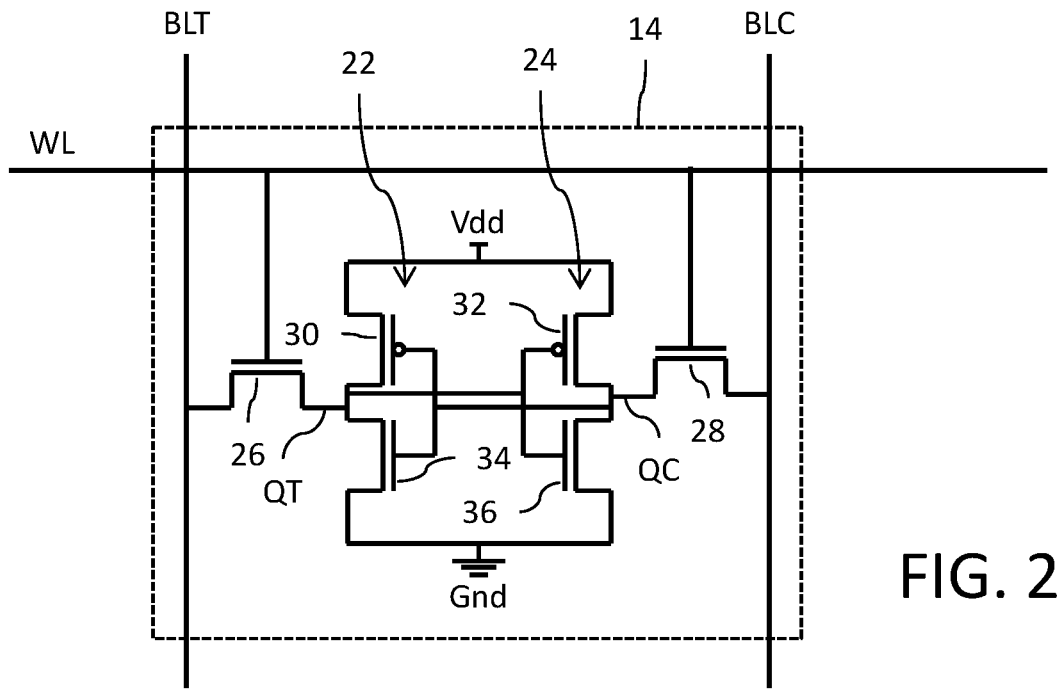
FIG. 2 is a circuit diagram of a standard 6T static random access memory (SRAM) cell as used the memory array of the in-memory computation circuit shown in FIG. 1.
Figure 3:
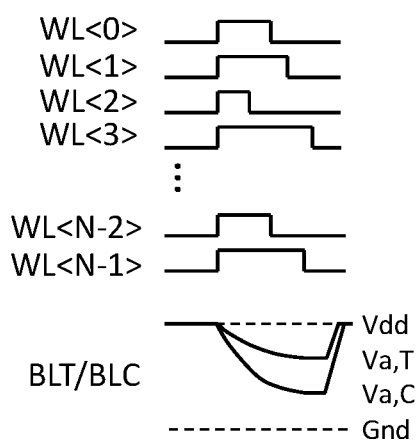
FIG. 3 is a timing diagram illustrating an in-memory compute operation.
Figure 4A:
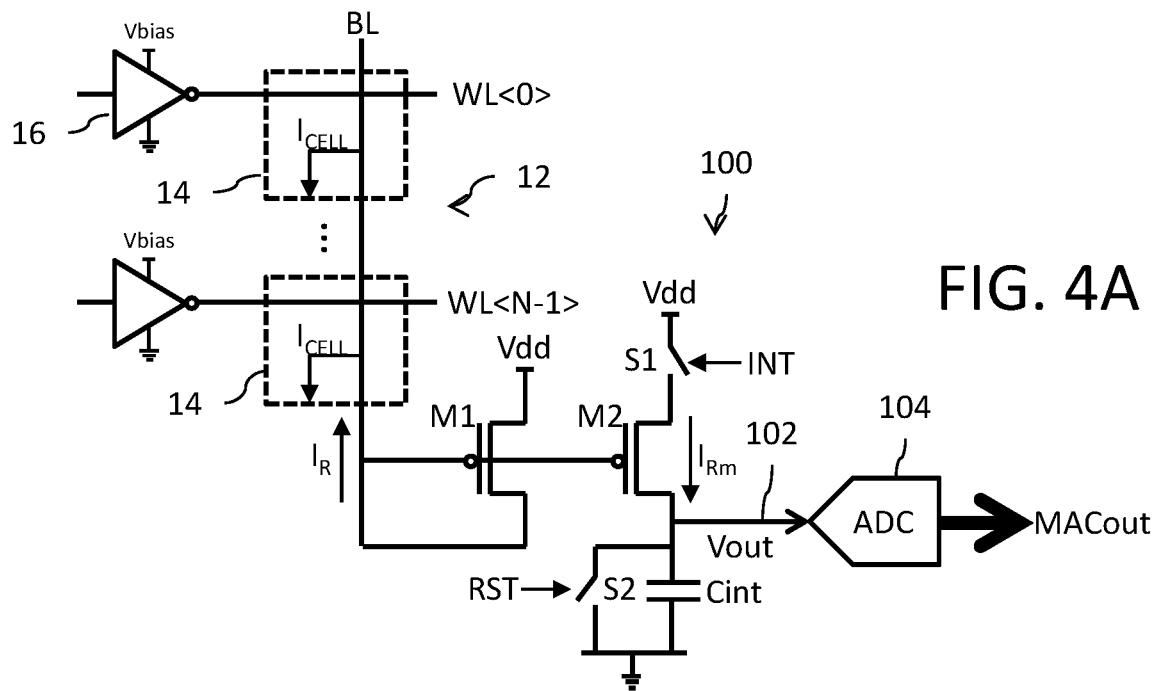
FIGS. 4A and 4B are circuit diagrams for a bit line read circuit.

Reference is now made to FIG. 4A which shows a circuit diagram for a bit line read circuit 100 used within the column processing circuit 20. A bit line BL for a given column of memory cells 14 in the array 12 is coupled, preferably directly connected, to the gate terminal and drain terminal of a p-channel MOS transistor M1. The bit line BL may, for example, comprise any of the complementary bit lines BLT, BLC or the read bit line BLR for a column of the memory. The source terminal of the transistor M1 is coupled, preferably directly connected, to a supply voltage Vdd node. The bit line BL is further coupled, preferably directly connected, to the gate terminal of a p-channel MOS transistor M2. The source terminal of the transistor M2 is coupled through a switch S1 to the supply voltage Vdd node. The open/close state of the switch S1 is controlled by the logic state of an integration signal INT. The drain terminal of transistor M2 is coupled, preferably directly connected, to an intermediate node 102. An integration capacitor Cint has a first terminal coupled, preferably directly connected, to the intermediate node 102 and a second terminal coupled, preferably directly connected, to a reference voltage (for example, ground) node. The intermediate node 102 is further coupled through a switch S2 to the reference voltage node. The open/close state of the switch S2 is controlled by the logic state of a reset signal RST.

The switches S1, S2 each may be implemented, for example, using a MOS transistor gate controlled by the appropriate one of the control signals RST and INT.

Figure 4B:
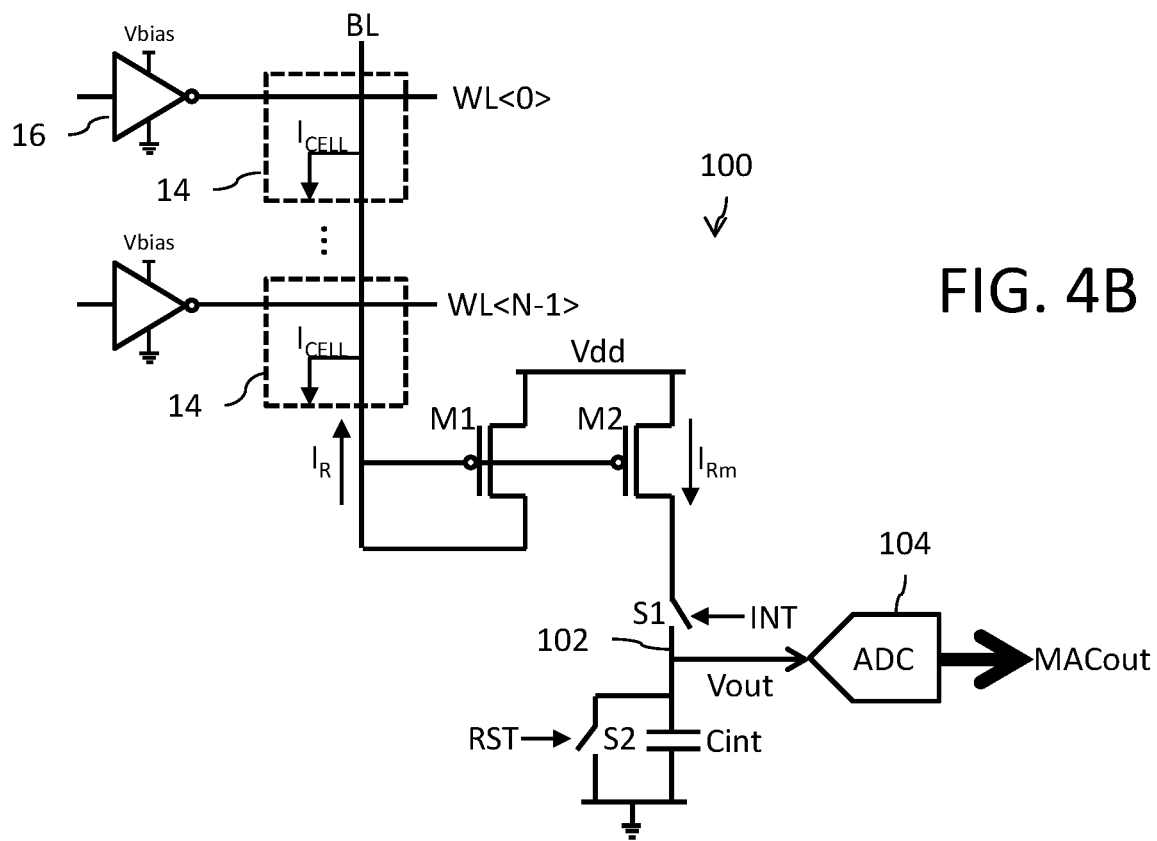

In an alternative embodiment, the switch S1 may be positioned between the drain of transistor M2 and the intermediate node 102 as shown in FIG. 4B. In either case, the transistors M1 and M2 along with switch S1 form a selectively actuatable (in response to control signal INT) current mirror circuit configured to generate a mirrored read current $I_{Rm}$ from the bit line BL read current $I_R$ formed by a sum of the cell currents $I_{CELL}$ of the memory cells 14 in the column during the in-memory compute operation when multiple ones of the word lines WL are simultaneously actuated with word line signal pulses dependent on the received feature data. The mirrored read current $I_{Rm}$ is then applied to charge the integration capacitor Cint and generate an output voltage Vout.

It will be understood that one bit line read circuit 100 is provided in the column processing circuit 20 for each column of the memory.

The intermediate node 102 is further coupled to an input of an analog-to-digital converter (ADC) circuit 104 that operates to convert the analog voltage Vout across the integration capacitor Cint to a digital signal MACout indicative of the result of the MAC operation. One ADC circuit 104 may be provided for each column. Alternatively, one ADC circuit 104 may be shared by multiple columns through a time division multiplexing operation. The digital signals MACout from each column may be output as the Decision from the column processing circuit 20 or combined with each other to generate the Decision.

Operation of the bit line read circuit 100 is as follows: At a beginning of a computation cycle for an in-memory compute operation, the reset signal RST is asserted to close the switch S2 and discharge the integration capacitor Cint. Simultaneous application of word line signals dependent on the received feature data is then made to plural rows of memory cells 14 in the SRAM array 12 for the in-memory compute operation and a read current $I_R$ develops on the bit line BL. The magnitude of the read current $I_R$ is a function of a sum of the currents $I_{CELL}$ sunk to ground by the memory cells 14 of the column which participates in the in-memory compute operation. The integration signal INT is asserted to close the switch S1 and begin the integration time period. The transistors M1 and M2 function as a current mirroring circuit and a mirrored read current $I_{Rm}$ is applied to charge the integration capacitor Cint to generate a voltage Vout=$I_{Rm}$*t/C, where t is the duration of the integration time period (when switch S1 is closed) and C is the capacitance of the integration capacitor Cint. When the integration time period expires, the integration signal INT is deasserted to open the switch S1. The voltage Vout across the integration capacitor Cint is then converted to the digital signal MACout by the ADC circuit 104.

It is important that the size of the transistor M1 in the selectively actuatable current mirror circuit be properly selected to handle the read current $I_R$ on the bit line BL so that the bit line voltage during the read operation does not drop below the write margin and risk the occurrence of an unwanted data flip at one (or more) of the simultaneously accessed memory cells 14. The transistor M1 thus functions to inhibit drop of a voltage on the bit line below a bit flip voltage. The design goal here is to size the transistor M1 to support maximum current sourcing to the bit line with all rows of the array selected (i.e., with actuated word lines) during the in-memory compute operation without risk of the bit line voltage level dropping below the write margin. One skilled in the art will know how to determine the required transistor size to meet the design goal.

Figure 5:
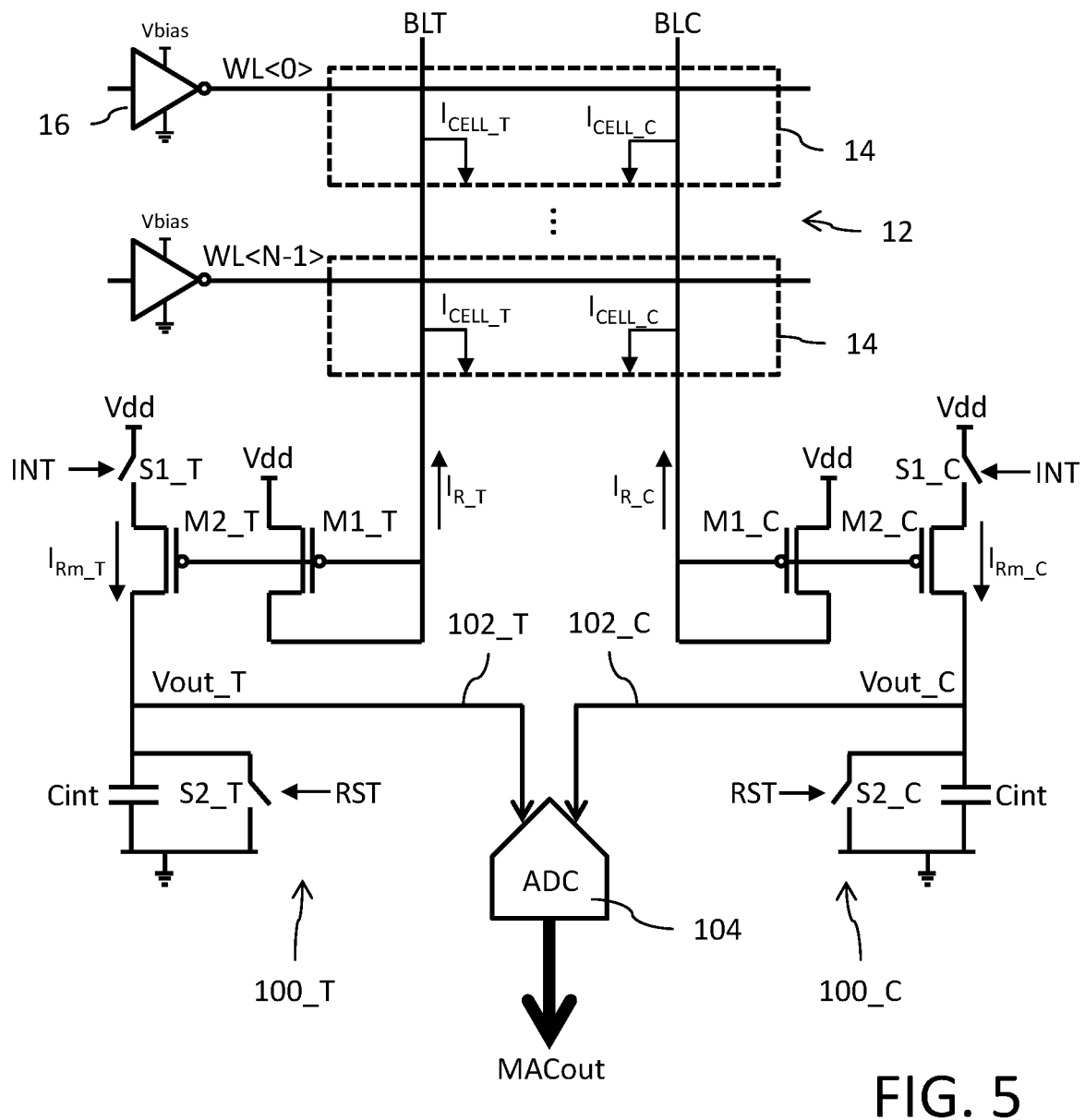
FIG. 5 is a circuit diagram for a differential signaling implementation of the bit line read circuit.

Reference is now made to FIG. 5 which shows a circuit diagram for a differential signaling implementation of the bit line read circuit 100. Like references refer to same or similar components. In this implementation, the currents on the true bit line BLT and the complement bit line BLC are processed by the bit line read circuit 100. The use of the suffix "_T" designates components associated with the processing of the read current on the true bit line BLT, and the use of the suffix "_C" designates components associated with the processing of the read current on the complement bit line BLC. Thus, the bit line read circuit 100 comprises a true read circuit 100_T for processing the read current $I_{R\_T}$ on the true bit line BLT and a complement read circuit 100_C for processing the read current $I_{R\_C}$ on the complement bit line BLC. The circuit configuration for each of the read circuits 100_T, 100_C is the same as shown in FIG. 4A and each circuit operates in the manner described above. The differential signaling implementation in FIG. 5 differs from the implementation of FIGS. 4A-4B in that differential integration voltages Vout_T, Vout_C are generated by the bit line read circuits 100_T, 100_C and the ADC circuit 104 operates to convert a difference between the voltages Vout_T, Vout_C for the digital signal MACout.

With reference now to the true read circuit 100_T, the true bit line BLT for a given column of memory cells 14 in the array 12 is coupled, preferably directly connected, to the gate terminal and drain terminal of a p-channel MOS transistor M1_T. The source terminal of the transistor M1_T is coupled, preferably directly connected, to a supply voltage Vdd node. The true bit line BLT is further coupled, preferably directly connected, to the gate terminal of a p-channel MOS transistor M2_T. The source terminal of the transistor M2_T is coupled through a switch S1_T to the supply voltage Vdd node. The open/close state of the switch S1_T is controlled by the logic state of an integration signal INT. The drain terminal of transistor M2_T is coupled, preferably directly connected, to an intermediate node 102_T. An integration capacitor Cint has a first terminal coupled, preferably directly connected, to the intermediate node 102_T and a second terminal coupled, preferably directly connected, to a reference voltage (for example, ground) node. The intermediate node 102_T is further coupled through a switch S2_T to the reference voltage node. The open/close state of the switch S2_T is controlled by the logic state of a reset signal RST.

For the complement read circuit 100_C, the complement bit line BLC for the given column of memory cells 14 in the array 12 is coupled, preferably directly connected, to the gate terminal and drain terminal of a p-channel MOS transistor M1_C. The source terminal of the transistor M1_C is coupled, preferably directly connected, to the supply voltage Vdd node. The complement bit line BLC is further coupled, preferably directly connected, to the gate terminal of a p-channel MOS transistor M2_C. The source terminal of the transistor M2_C is coupled through a switch S1_C to the supply voltage Vdd node. The open/close state of the switch SiC is controlled by the logic state of the integration signal INT. The drain terminal of transistor M2_C is coupled, preferably directly connected, to an intermediate node 102_C. An integration capacitor Cint has a first terminal coupled, preferably directly connected, to the intermediate node 102_C and a second terminal coupled, preferably directly connected, to the reference voltage (for example, ground) node. The intermediate node 102_C is further coupled through a switch S2_C to the reference voltage node. The open/close state of the switch S2_C is controlled by the logic state of a reset signal RST.

The switches S1_T, S1_C, S2_T, S2_C each may be implemented, for example, using a MOS transistor gate controlled by the appropriate one of the control signals RST and INT.

It will be understood that each of the read circuits 100_T, 100_C in of FIG. 5 could alternatively be implemented in the manner shown in FIG. 4B, and in this configuration the switches S1_T, S1_C would instead be positioned between the drain of transistors M2_T, M2_C, respectively, and the intermediate nodes 102_T, 102_C. In either case, the transistors M1_T and M2_T along with switch S1_T, respectively M1_C and M2_C along with switch S1_C, form a selectively actuatable (in response to control signal INT) current mirror circuit configured to generate a mirrored read current $I_{Rm}$ from the bit line BL read current $I_R$ formed by a sum of the cell currents $I_{CELL}$ of the memory cells 14 in the column. The mirrored read current $I_{Rm}$ is then applied to charge the integration capacitor Cint and generate an output voltage Vout.

It will be understood that one pair of bit line read circuits 100_T, 100_C is provided in the column processing circuit 20 for each column of the memory.

The intermediate nodes 102_T, 102_C are further coupled to the differential inputs of an analog-to-digital converter (ADC) circuit 104 that operates to convert a difference between the analog voltages Vout_T, Vout_C to a digital signal MACout indicative of the result of the MAC operation. One ADC circuit 104 may be provided for each column. Alternatively, one ADC circuit 104 may be shared by multiple columns through a time division multiplexing operation. The digital signals MACout from each column may be output as the Decision from the column processing circuit 20 or combined with each other to generate the Decision.

Operation of the bit line read circuit 100 is as follows: At a beginning of a computation cycle for an in-memory compute operation, the reset signal RST is asserted to close the switches S2_T, S2_C and discharge the integration capacitors Cint. Simultaneous application of word line signals dependent on the received feature data is then made to plural rows of memory cells 14 in the SRAM array 12 for the in-memory compute operation and true and complement read currents $I_{R\_T}$, $I_{R\_C}$ develop on the complementary bit lines BLT, BLC. The magnitudes of the read currents $I_{R\_T}$, $I_{R\_C}$ are a function of a sum of the currents $I_{CELL}$ sunk to ground by the memory cells 14 of the column which participates in the in-memory compute operation. The integration signal INT is asserted to close the switches S1_T, S1_C and begin the integration time period. The transistors M1_T and M2_T, M1_C and M1_C function as current mirroring circuits and corresponding mirrored read currents $I_{Rm\_T}$, $I_{Rm\_C}$ are applied to charge the integration capacitors Cint to generate voltages Vout_T, Vout_C as a function of $I_{Rm}$*t/C, where t is the duration of the integration time period (when switches S1_T and S1_C are closed) and C is the capacitance of the integration capacitor Cint. When the integration time period expires, the integration signal INT is deasserted to open the switches S1_T, S1, C. A difference between the voltages Vout_T, Vout_C across the integration capacitors Cint is then converted to the digital signal MACout by the ADC circuit 104.

It is important that the size of the transistors M1_T, M1_C in the selectively actuatable current mirror circuits be properly selected to handle the read currents $I_{R\_T}$, $I_{R\_C}$ on the bit lines BLT, BLC so that the bit line voltage during the read operation does not drop below the write margin and risk the occurrence of an unwanted data flip at one (or more) of the simultaneously accessed memory cells 14. The transistors M1_T and M1_C thus function to inhibit drop of a voltage on the bit line below a bit flip voltage. The design goal here is to size the transistors M1_T and M1_C to support maximum current sourcing to the bit lines BLT and BLC, respectively, with all rows of the array selected (i.e., with actuated word lines) during the in-memory compute operation without risk of the bit line voltage level dropping below the write margin. One skilled in the art will know how to determine the required transistor size to meet the design goal.

Figure 6:
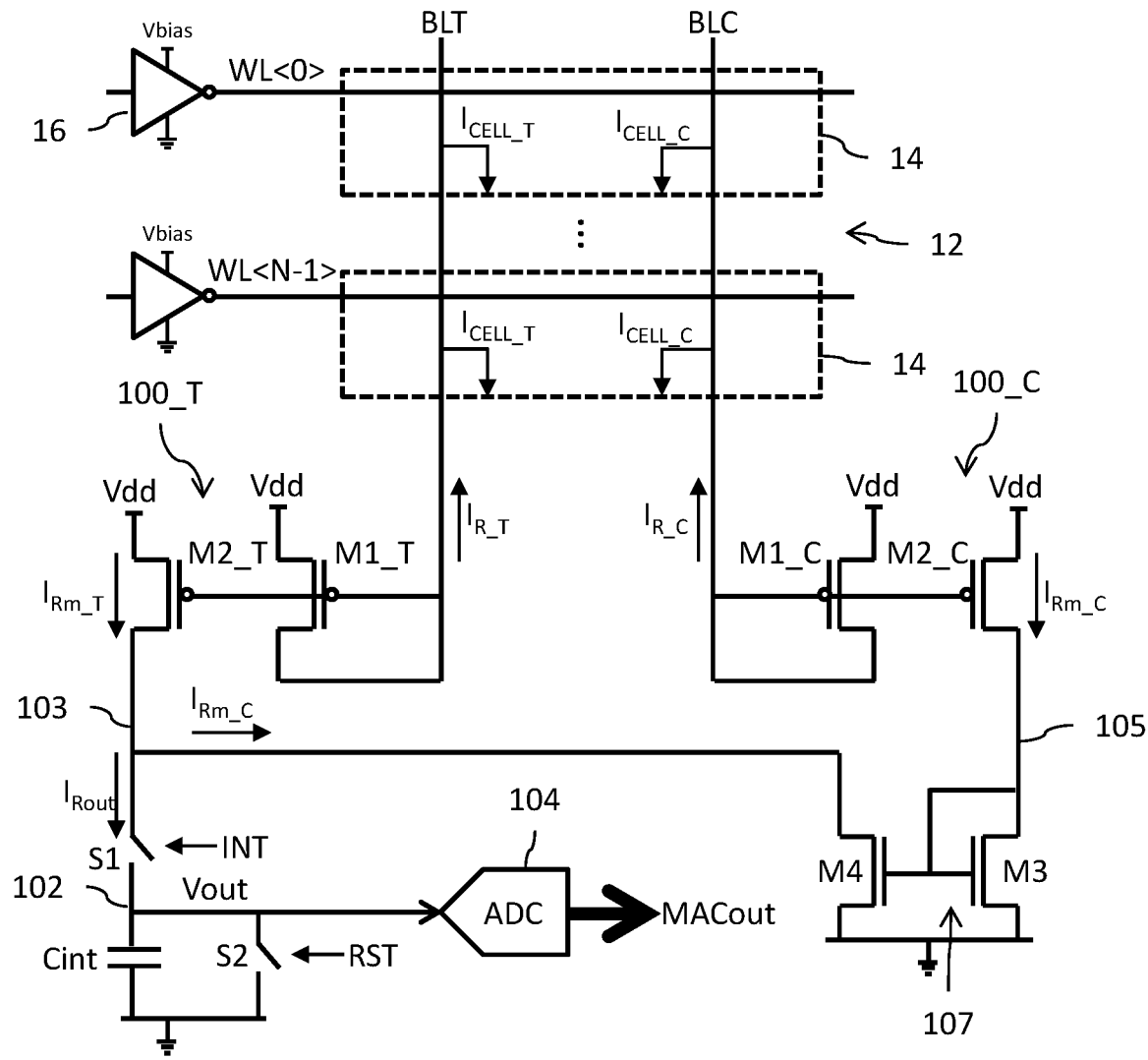
FIG. 6 is a circuit diagram for a single ended signaling implementation of the bit line read circuit.

Reference is now made to FIG. 6 which shows a circuit diagram for a single ended signaling implementation of the bit line read circuit 100. Like references refer to same or similar components. In this implementation, the currents on the true bit line BLT and the complement bit line BLC are processed by the bit line read circuit 100. The use of the suffix "_T" designates components associated with the processing of the read current on the true bit line BLT, and the use of the suffix "_C" designates components associated with the processing of the read current on the complement bit line BLC. Thus, the bit line read circuit 100 comprises a true read circuit 100_T for processing the read current $I_{R\_T}$ on the true bit line BLT and a complement read circuit 100_C for processing the read current $I_{R\_C}$ on the complement bit line BLC. The single ended signaling implementation in FIG. 6 primarily differs from the differential signaling implementation in FIG. 5 in that a single output voltage Vout is generated from an integration of a difference between the mirrored read currents $I_{Rm\_T}$, $I_{Rm\_C}$, with that output voltage Vout then being converted by the ADC circuit 104 to generate the digital signal MACout.

With reference now to the true read circuit 100_T, the true bit line BLT for a given column of memory cells 14 in the array 12 is coupled, preferably directly connected, to the gate terminal and drain terminal of a p-channel MOS transistor M1_T. The source terminal of the transistor M1_T is coupled, preferably directly connected, to a supply voltage Vdd node. The true bit line BLT is further coupled, preferably directly connected, to the gate terminal of a p-channel MOS transistor M2_T. The source terminal of the transistor M2_T is coupled, preferably directly connected, to the supply voltage Vdd node. The drain terminal of transistor M2_T is coupled, preferably directly connected, to a current summing node 103.

For the complement read circuit 100_C, the complement bit line BLC for the given column of memory cells 14 in the array 12 is coupled, preferably directly connected, to the gate terminal and drain terminal of a p-channel MOS transistor M1_C. The source terminal of the transistor M1_C is coupled, preferably directly connected, to the supply voltage Vdd node. The complement bit line BLC is further coupled, preferably directly connected, to the gate terminal of a p-channel MOS transistor M2_C. The source terminal of the transistor M2_C is coupled, preferably directly connected, to the supply voltage Vdd node. The drain terminal of transistor M2_C is coupled, preferably directly connected, to a current input node 105 of an n-channel current mirror circuit 107 formed by input transistor M3 and output transistor M4 which share common gate terminals and common source terminals, with the drain and gate of input transistor M3 directly connected at the input node 105. An output of the current mirror circuit 107 at the drain of transistor M4 is coupled, preferably directly connected, to the current summing node 103.

At the current summing node 103, the mirrored read current $I_{Rm\_C}$ from the complement read circuit 100_C is subtracted from the mirrored read current $I_{Rm\_T}$ from the true read circuit 100_T to generate a resulting output read current $I_{Rout}$.

The output read current $I_{Rout}$ from the current summing node 103 is coupled through a switch S1 to an intermediate node 102. The open/close state of the switch S1 is controlled by the logic state of an integration signal INT. An integration capacitor Cint has a first terminal coupled, preferably directly connected, to the intermediate node 102 and a second terminal coupled, preferably directly connected, to the reference voltage (for example, ground) node. The intermediate node 102 is further coupled through a switch S2 to the reference voltage node. The open/close state of the switch S2 is controlled by the logic state of a reset signal RST.

The switches S1, S2 each may be implemented, for example, using a MOS transistor gate controlled by the appropriate one of the control signals RST and INT.

It will be understood that one pair of bit line read circuits 100_T, 100_C is provided in the column processing circuit 20 for each column of the memory.

The intermediate node 102 is further coupled to an input of an analog-to-digital converter (ADC) circuit 104 that operates to convert the analog voltage Vout across the integration capacitor Cint to a digital signal MACout indicative of the result of the MAC operation. One ADC circuit 104 may be provided for each column. Alternatively, one ADC circuit 104 may be shared by multiple columns through a time division multiplexing operation. The digital signals MACout from each column may be output as the Decision from the column processing circuit 20 or combined with each other to generate the Decision.

Operation of the bit line read circuit 100 is as follows: At a beginning of a computation cycle for an in-memory compute operation, the reset signal RST is asserted to close the switch S2 and discharge the integration capacitor Cint. Simultaneous application of word line signals in response to the received Feature data is then made to plural rows of memory cells 14 in the SRAM array 12 for the in-memory compute operation and true and complement read currents $I_{R\_T}$, $I_{R\_C}$ develop on the complementary bit lines BLT, BLC. The magnitudes of the read currents $I_{R\_T}$, $I_{R\_C}$ are a function of a sum of the currents $I_{CELL}$ sunk to ground by the memory cells 14 of the column which participates in the in-memory compute operation. The integration signal INT is asserted to close the switch S1 and begin the integration time period. The transistors M1_T and M2_T, M1_C and M1_C, and M3 and M4 function as current mirroring circuits and corresponding mirrored read currents $I_{Rm\_T}$, $I_{Rm\_C}$ are applied to the current summing node 103. The mirrored read current $I_{Rm\_C}$ is subtracted from the mirrored read current $I_{Rm\_T}$ and the resulting output read current $I_{Rout}$ is applied to charge the integration capacitor Cint and generate the output voltage Vout as a function of $I_{Rout}*t/C$, where t is the duration of the integration time period (when the switch S1 is closed) and C is the capacitance of the integration capacitor Cint. When the integration time period expires, the integration signal INT is deasserted to open the switch S1. The voltage Vout across the integration capacitor Cint is then converted to the digital signal MACout by the ADC circuit 104.

It is important that the size of the transistors M1_T, M1_C in the selectively actuatable current mirror circuit be properly selected to handle the read currents $I_{R\_T}$, $I_{R\_C}$ on the bit lines BLT, BLC so that the bit line voltage during the read operation does not drop below the write margin and risk the occurrence of an unwanted data flip at one (or more) of the simultaneously accessed memory cells 14. The transistors M1_T and M1_C thus function to inhibit drop of a voltage on the bit line below a bit flip voltage. The design goal here is to size the transistors M1_T and M1_C to support maximum current sourcing to the bit lines BLt and BLC, respectively, with all rows of the array selected (i.e., with actuated word lines) during the in-memory compute operation without risk of the bit line voltage level dropping below the write margin. One skilled in the art will know how to determine the required transistor size to meet the design goal.

Figure 7:
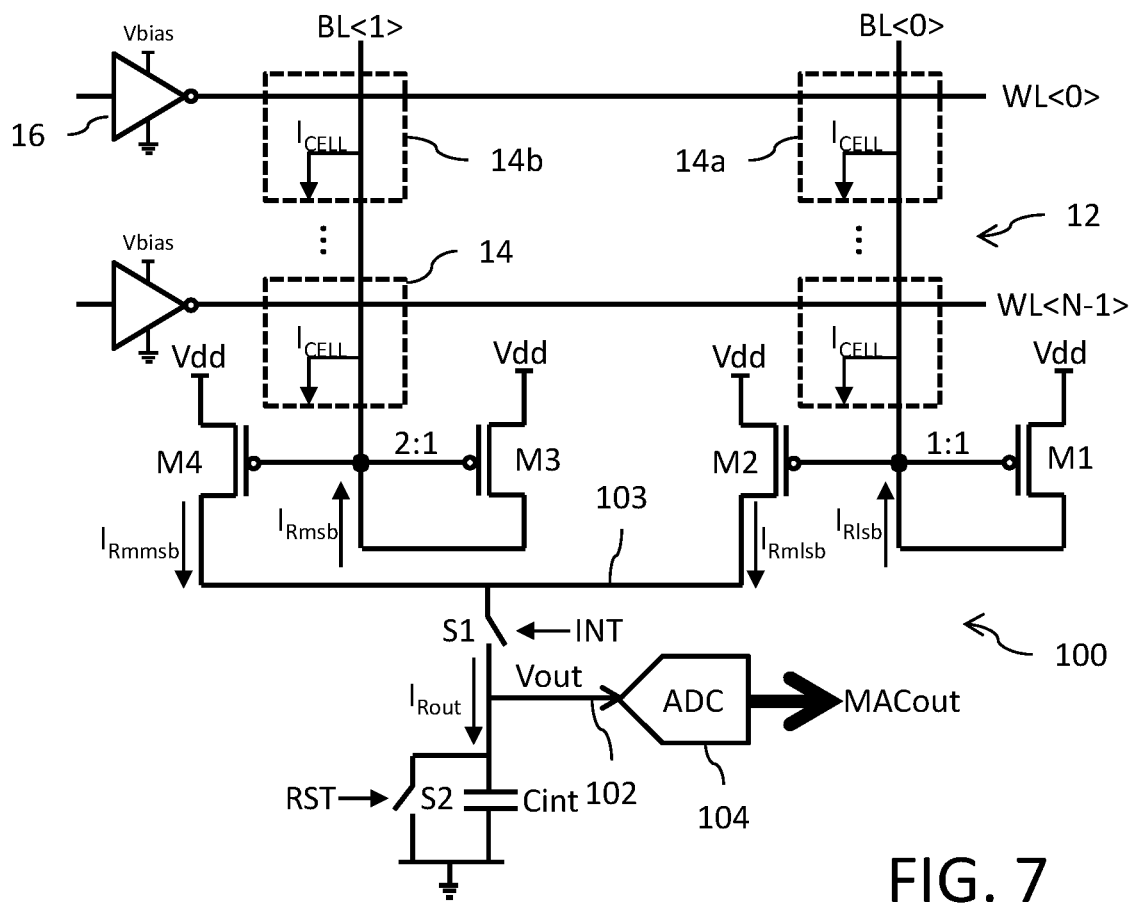
FIG. 7 is a circuit diagram for an implementation of the bit line read circuit supporting multibit weight data.

The foregoing implementations illustrate operation for an in-memory compute where single bit weight data is being processed. It will be understood, however, that all of these implementations are equally applicable when multibit weight data is being processed. With reference to FIG. 7 (generally corresponding to the implementation of FIG. 4B), an implementation is shown where the weight data includes two bits stored in the memory cells 14a and 14b of two columns in the array associated with two bit lines BL<0> and BL<1>. In this example, the less significant bit (lsb) of the weight data is stored in memory cell 14a and the more significant bit (msb) of the weight data is stored in memory cell 14b.

The bit line BL<0> for the less significant bit column of memory cells 14 in the array 12 is coupled, preferably directly connected, to the gate terminal and drain terminal of a p-channel MOS transistor M1. The bit line BL<0> may, for example, comprise any of the complementary bit lines BLT, BLC or the read bit line BLR for a column of the memory. The source terminal of the transistor M1 is coupled, preferably directly connected, to a supply voltage Vdd node. The bit line BL<0> is further coupled, preferably directly connected, to the gate terminal of a p-channel MOS transistor M2. The source terminal of the transistor M2 is coupled, preferably directly connected, to the supply voltage Vdd node. The drain terminal of transistor M2 is coupled, preferably directly connected, to a current summation node 103. The transistors M1 and M2 form a current mirroring circuit, and the transistors M1, M2 are sized to provide a 1:1 current mirroring ratio between the bit line current $I_{Rlsb}$ and the mirrored bit line current $I_{Rmlsb}$ (i.e., $I_{Rmlsb}=I_{Rlsb}$).

The bit line BL<1> for the more significant bit column of memory cells 14 in the array 12 is coupled, preferably directly connected, to the gate terminal and drain terminal of a p-channel MOS transistor M3. The bit line BL<1> may, for example, comprise any of the complementary bit lines BLT, BLC or the read bit line BLR for a column of the memory. The source terminal of the transistor M3 is coupled, preferably directly connected, to a supply voltage Vdd node. The bit line BL<1> is further coupled, preferably directly connected, to the gate terminal of a p-channel MOS transistor M4. The source terminal of the transistor M4 is coupled, preferably directly connected, to the supply voltage Vdd node. The drain terminal of transistor M4 is coupled, preferably directly connected, to the current summation node 103. The transistors M3 and M4 form a current mirroring circuit, and the transistors M3, M4 are sized to provide a 1:2 current mirroring ratio between the bit line current $I_{Rmsb}$ and the mirrored bit line current $I_{Rmmsb}$ (i.e., $I_{Rmmsb}=2*I_{Rmsb}$).

More generally speaking, there is a weighted relationship between the current mirroring ratios of the current mirror connected transistors across the plurality of columns of memory cells storing multi-bit weight data. So, if a further bit line BL<2> were involved, the current mirror connected transistors for that column, in accordance with the weighted relationship, may have a 1:4 current mirroring ratio.

At the current summing node 103, the mirrored read currents $I_{Rmlsb}$ and $I_{Rmmsb}$ are added together to generate a resulting output read current $I_{Rout}$. It will be noted that the current summation is implemented with a binary weighting due to the respective weighted current mirroring ratios of the current mirroring circuits.

The output read current $I_{Rout}$ from the current summing node 103 is coupled through a switch S1 to an intermediate node 102. The open/close state of the switch S1 is controlled by the logic state of an integration signal INT. An integration capacitor Cint has a first terminal coupled, preferably directly connected, to the intermediate node 102 and a second terminal coupled, preferably directly connected, to the reference voltage (for example, ground) node. The intermediate node 102 is further coupled through a switch S2 to the reference voltage node. The open/close state of the switch S2 is controlled by the logic state of a reset signal RST.

The switches S1, S2 each may be implemented, for example, using a MOS transistor gate controlled by the appropriate one of the control signals RST and INT.

The intermediate node 102 is further coupled to an input of an analog-to-digital converter (ADC) circuit 104 that operates to convert the analog voltage Vout across the integration capacitor Cint to a digital signal MACout indicative of the result of the MAC operation. One ADC circuit 104 may be provided for each set of columns storing the multi-bit weight data. Alternatively, one ADC circuit 104 may be shared by each set of columns through a time division multiplexing operation. The digital signals MACout from each set of columns may be output as the Decision from the column processing circuit 20 or combined with each other to generate the Decision.

Operation of the bit line read circuit 100 is as follows: At a beginning of a computation cycle for an in-memory compute operation, the reset signal RST is asserted to close the switch S2 and discharge the integration capacitor Cint. Simultaneous application of word line signals dependent on the received feature data is then made to plural rows of memory cells 14 in the SRAM array 12 for the in-memory compute operation and less significant bit and more significant bit read currents $I_{Rlsb}$, $I_{Rmsb}$ develop on the bit lines BL<0> and BL<1>, respectively. The magnitudes of the read currents $I_{Rlsb}$, $I_{Rmsb}$ are a function of a sum of the currents $I_{CELL}$ sunk to ground by the memory cells 14 of the column which participates in the in-memory compute operation. The integration signal INT is asserted to close the switch S1 and begin the integration time period. The transistors M1 and M2, M3 and M4 function as current mirroring circuits and corresponding mirrored read currents $I_{Rmlsb}$, $I_{Rmmsb}$ are applied to the current summing node 103. The mirrored read currents $I_{Rmlsb}$, $I_{Rmmsb}$ are added together, and the resulting output read current $I_{Rout}$ is applied to charge the integration capacitor Cint and generate the output voltage Vout as a function of $I_{Rout}*t/C$, where t is the duration of the integration time period (when the switch S1 is closed) and C is the capacitance of the integration capacitor Cint. When the integration time period expires, the integration signal INT is deasserted to open the switch S1. The voltage Vout across the integration capacitor Cint is then converted to the digital signal MACout by the ADC circuit 104.

Figure 8:
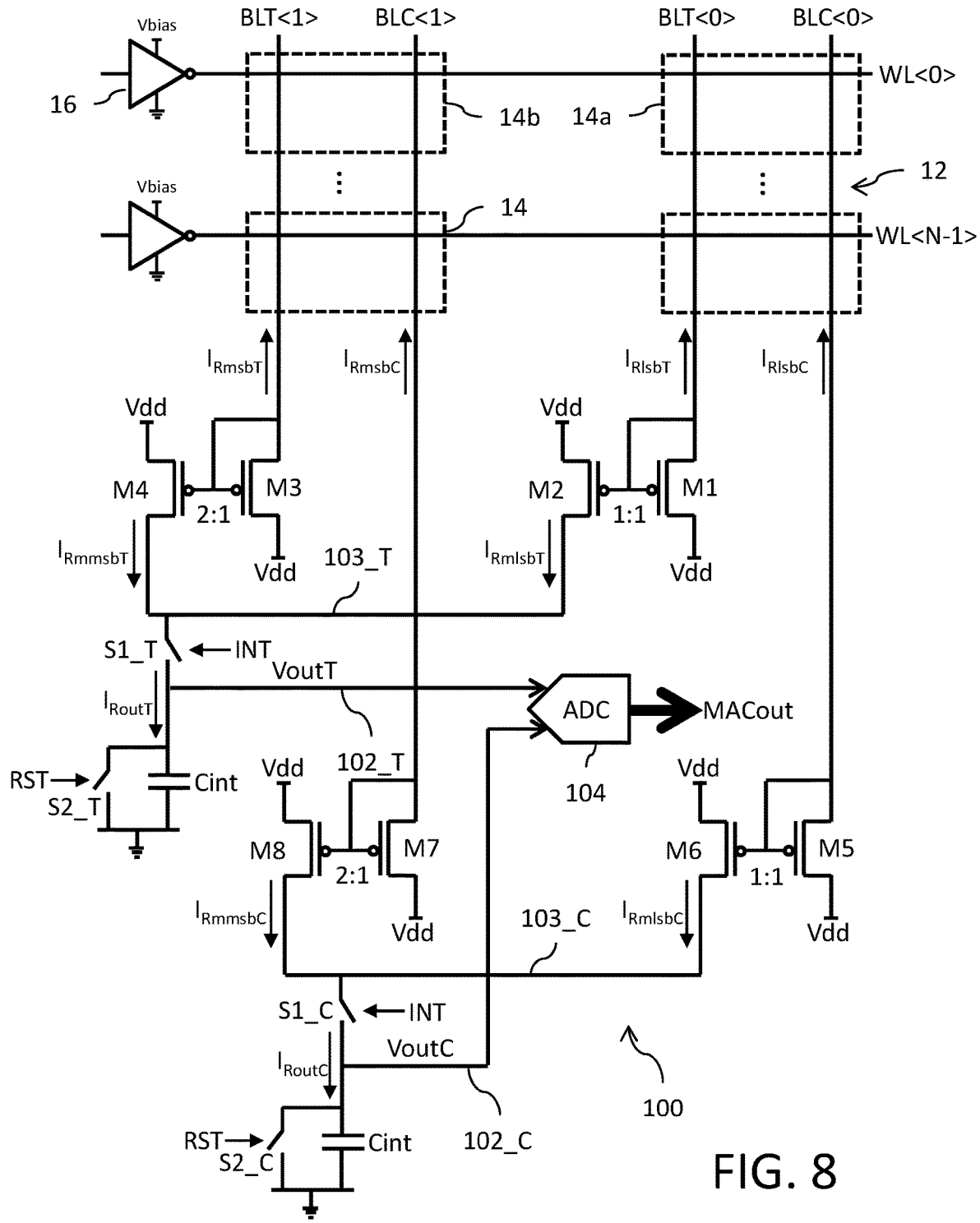
FIG. 8 is a circuit diagram for a differential signaling implementation of the bit line read circuit supporting multibit weight data.

Further to application of the implementations when multibit weight data is being processed, reference is now made to FIG. 8 (generally corresponding to the implementation of FIG. 5), where an implementation is shown for processing weight data having two bits stored in the memory cells 14a and 14b of two columns in the array associated with complementary bit lines BLT<0>, BLC<0> and BLT<1>, BLC<1>. In this example, the less significant bit (lsb) of the weight data is stored in memory cell 14a and the more significant bit (msb) of the weight data is stored in memory cell 14b.

The true bit line BLT<0> for the less significant bit column of memory cells 14 in the array 12 is coupled, preferably directly connected, to the gate terminal and drain terminal of a p-channel MOS transistor M1. The source terminal of the transistor M1 is coupled, preferably directly connected, to a supply voltage Vdd node. The bit line BLT<0> is further coupled, preferably directly connected, to the gate terminal of a p-channel MOS transistor M2. The source terminal of the transistor M2 is coupled, preferably directly connected, to the supply voltage Vdd node. The drain terminal of transistor M2 is coupled, preferably directly connected, to a true current summation node 103_T. The transistors M1 and M2 form a current mirroring circuit, and the transistors M1, M2 are sized to provide a 1:1 current mirroring ratio between the bit line current $I_{RlsbT}$ and the mirrored bit line current $I_{RmlsbT}$ (i.e., $I_{RmlsbT}=I_{RlsbT}$).

The true bit line BLT<1> for the more significant bit column of memory cells 14 in the array 12 is coupled, preferably directly connected, to the gate terminal and drain terminal of a p-channel MOS transistor M3. The source terminal of the transistor M3 is coupled, preferably directly connected, to a supply voltage Vdd node. The bit line BLT<1> is further coupled, preferably directly connected, to the gate terminal of a p-channel MOS transistor M4. The source terminal of the transistor M4 is coupled, preferably directly connected, to the supply voltage Vdd node. The drain terminal of transistor M4 is coupled, preferably directly connected, to the true current summation node 103_T. The transistors M3 and M4 form a current mirroring circuit, and the transistors M3, M4 are sized to provide a 1:2 current mirroring ratio between the bit line current $I_{RmsbT}$ and the mirrored bit line current $I_{RmssbT}$ (i.e., $I_{RmmsbT}=2*I_{RmsbT}$).

More generally speaking, there is a weighted relationship between the current mirroring ratios of the current mirror connected transistors across the plurality of columns of memory cells storing multi-bit weight data. So, if a further bit line BLT<2> were involved, the current mirror connected transistors for that column, in accordance with the weighted relationship, may have a 1:4 current mirroring ratio.

At the current summing node 103_T, the mirrored read currents $I_{RmlsbT}$ and $I_{RmmsbT}$ are added together to generate a resulting output true read current $I_{RoutT}$. It will be noted that the current summation is implemented with a binary weighting due to the weighted current mirroring ratios of the current mirroring circuits.

The output read current $I_{RoutT}$ from the current summing node 103_T is coupled through a switch S1_T to an intermediate node 102_T. The open/close state of the switch S1_T is controlled by the logic state of an integration signal INT. An integration capacitor Cint has a first terminal coupled, preferably directly connected, to the intermediate node 102_T and a second terminal coupled, preferably directly connected, to the reference voltage (for example, ground) node. The intermediate node 102_T is further coupled through a switch S2_T to the reference voltage node. The open/close state of the switch S2_T is controlled by the logic state of a reset signal RST.

The switches S1_T, S2_T each may be implemented, for example, using a MOS transistor gate controlled by the appropriate one of the control signals RST and INT.

The complement bit line BLC<0> for the less significant bit column of memory cells 14 in the array 12 is coupled, preferably directly connected, to the gate terminal and drain terminal of a p-channel MOS transistor M5. The source terminal of the transistor M5 is coupled, preferably directly connected, to a supply voltage Vdd node. The bit line BLC<0> is further coupled, preferably directly connected, to the gate terminal of a p-channel MOS transistor M6. The source terminal of the transistor M6 is coupled, preferably directly connected, to the supply voltage Vdd node. The drain terminal of transistor M6 is coupled, preferably directly connected, to a complement current summation node 103_C. The transistors M5 and M6 form a current mirroring circuit, and the transistors M5, M6 are sized to provide a 1:1 current mirroring ratio between the bit line current $I_{RlsbC}$ and the mirrored bit line current $I_{RmlsbC}$ (i.e., $I_{RmlsbC}=I_{RlsbC}$).

The complement bit line BLC<1> for the more significant bit column of memory cells 14 in the array 12 is coupled, preferably directly connected, to the gate terminal and drain terminal of a p-channel MOS transistor M7. The source terminal of the transistor M7 is coupled, preferably directly connected, to a supply voltage Vdd node. The bit line BLC<1> is further coupled, preferably directly connected, to the gate terminal of a p-channel MOS transistor M8. The source terminal of the transistor M8 is coupled, preferably directly connected, to the supply voltage Vdd node. The drain terminal of transistor M8 is coupled, preferably directly connected, to the complement current summation node 103_C. The transistors M7 and M8 form a current mirroring circuit, and the transistors M7, M8 are sized to provide a 1:2 current mirroring ratio between the bit line current $I_{RmsbC}$ and the mirrored bit line current $I_{RmssbC}$ (i.e., $I_{RmmsbC}=2*I_{RmsbC}$).

More generally speaking, there is a weighted relationship between the current mirroring ratios of the current mirror connected transistors across the plurality of columns of memory cells storing multi-bit weight data. So, if a further bit line BLC<2> were involved, the current mirror connected transistors for that column, in accordance with the weighted relationship, may have a 1:4 current mirroring ratio.

At the current summing node 103_C, the mirrored read currents $I_{RmlsbC}$ and $I_{RmmsbC}$ are added together to generate a resulting output complement read current $I_{RoutC}$. It will be noted that the current summation is implemented with a binary weighting due to the weighted current mirroring ratios of the current mirroring circuits.

The output read current $I_{RoutC}$ from the current summing node 103_C is coupled through a switch S1_C to an intermediate node 102_C. The open/close state of the switch S1_C is controlled by the logic state of an integration signal INT. An integration capacitor Cint has a first terminal coupled, preferably directly connected, to the intermediate node 102_C and a second terminal coupled, preferably directly connected, to the reference voltage (for example, ground) node. The intermediate node 102_C is further coupled through a switch S2_C to the reference voltage node. The open/close state of the switch S2_C is controlled by the logic state of a reset signal RST.

The switches S1_C, S2_C each may be implemented, for example, using a MOS transistor gate controlled by the appropriate one of the control signals RST and INT.

The intermediate nodes 102_T, 102_C are further coupled to the differential inputs of an analog-to-digital converter (ADC) circuit 104 that operates to convert a difference between the analog voltages Vout_T, Vout_C to a digital signal MACout indicative of the result of the MAC operation. One ADC circuit 104 may be provided for each set of columns for the multibit weight data. Alternatively, one ADC circuit 104 may be shared by multiple sets of columns through a time division multiplexing operation. The digital signals MACout from each set of columns may be output as the Decision from the column processing circuit 20 or combined with each other to generate the Decision.

Operation of the bit line read circuit 100 is as follows: At a beginning of a computation cycle for an in-memory compute operation, the reset signal RST is asserted to close the switches S2_T, S2_C and discharge the integration capacitors Cint. Simultaneous application of word line signals dependent on the received feature data is then made to plural rows of memory cells 14 in the SRAM array 12 for the in-memory compute operation and true read currents $I_{RlsbT}$ and $I_{RmsbT}$ develop on the true bit lines BLT and complement read currents read currents $I_{RlsbC}$ and $I_{RmsbC}$ develop on the complement bit lines BLC. The magnitudes of these read currents are a function of a sum of the currents $I_{CELL}$ sunk to ground by the memory cells 14 of the column which participates in the in-memory compute operation. The integration signal INT is asserted to close the switches S1_T, S1_C and begin the integration time period. The true read currents $I_{RlsbT}$ and $I_{RmsbT}$ are mirrored to generate the true mirrored read currents $I_{RmlsbT}$ and $I_{RmmsbT}$ which are summed at the true current summation node 103_T to generate the output true read current $I_{RoutT}$. This current is applied to charge the integration capacitor Cint to generate the voltage Vout_T as a function of $I_{RoutT}*t/C$, where t is the duration of the integration time period (when switch S1_T is closed) and C is the capacitance of the integration capacitor Cint. The complement read currents $I_{RlsbC}$ and $I_{RmsbC}$ are mirrored to generate the complement mirrored read currents $I_{RmlsbC}$ and $I_{RmmsbC}$ which are summed at the complement current summation node 103_C to generate the output complement read current $I_{RoutC}$. This current is applied to charge the integration capacitor Cint to generate the voltage Vout_C as a function of $I_{RoutC}*t/C$, where t is the duration of the integration time period (when switch S1_C is closed) and C is the capacitance of the integration capacitor Cint. When the integration time period expires, the integration signal INT is deasserted to open the switches S1_T, S1, C. A difference between the voltages Vout_T, Vout_C across the integration capacitors Cint is then converted to the digital signal MACout by the ADC circuit 104.

Figure 9:
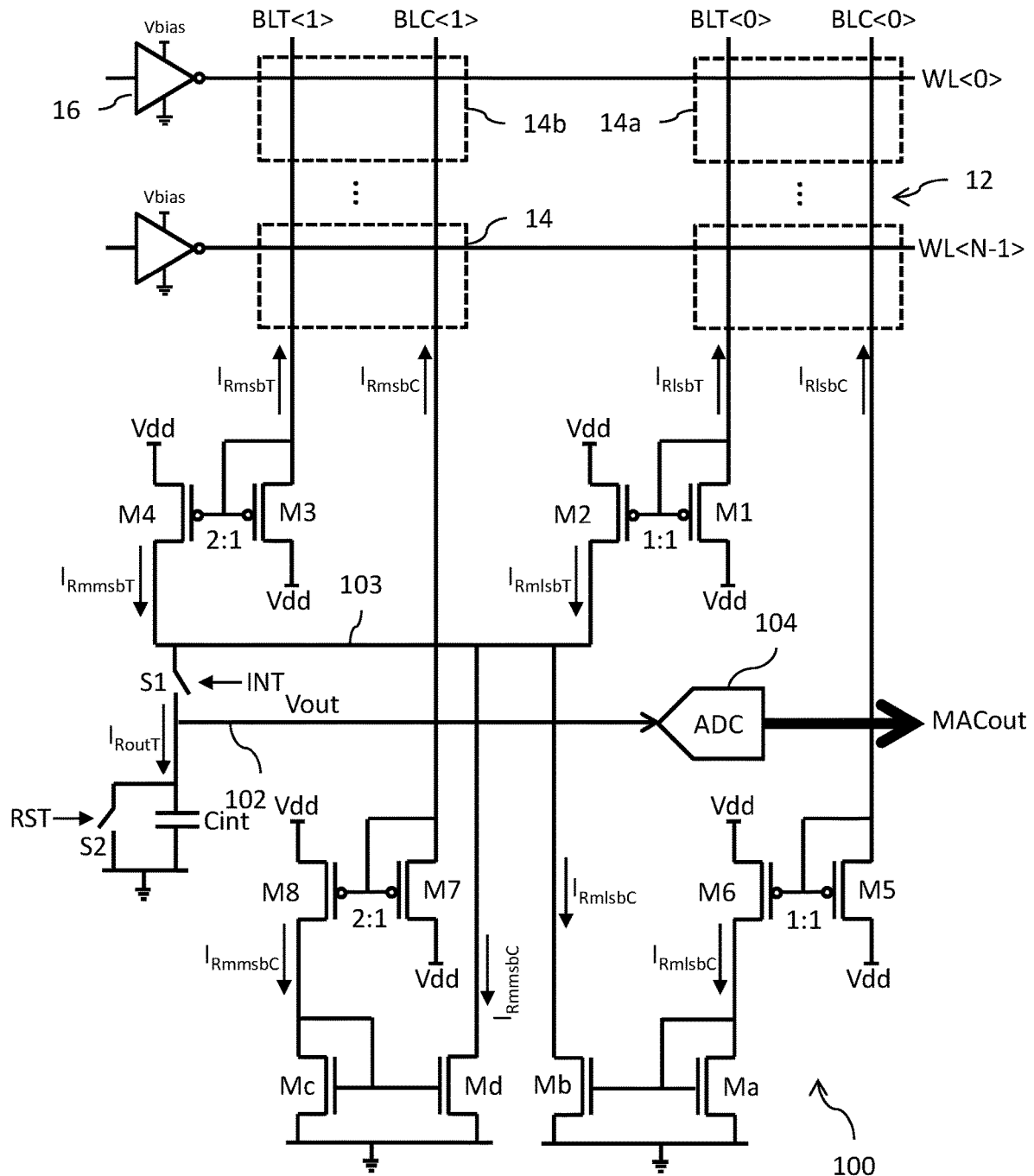
FIG. 9 is a circuit diagram for an implementation of the bit line read circuit supporting multibit weight data.

Still further to application of the implementations when multibit weight data is being processed, reference is now made to FIG. 9 (generally corresponding to the implementation of FIG. 6), where an implementation is shown for processing weight data having two bits stored in the memory cells 14*a* and 14*b* of two columns in the array associated with complementary bit lines BLT<0>, BLC<0> and BLT<1>, BLC<1>. In this example, the less significant bit (lsb) of the weight data is stored in memory cell 14*a* and the more significant bit (msb) of the weight data is stored in memory cell 14*b*.

The true bit line BLT<0> for the less significant bit column of memory cells 14 in the array 12 is coupled, preferably directly connected, to the gate terminal and drain terminal of a p-channel MOS transistor M1. The source terminal of the transistor M1 is coupled, preferably directly connected, to a supply voltage Vdd node. The bit line BLT<0> is further coupled, preferably directly connected, to the gate terminal of a p-channel MOS transistor M2. The source terminal of the transistor M2 is coupled, preferably directly connected, to the supply voltage Vdd node. The drain terminal of transistor M2 is coupled, preferably directly connected, to a current summation node 103. The transistors M1 and M2 form a current mirroring circuit, and the transistors M1, M2 are sized to provide a 1:1 current mirroring ratio between the bit line current $I_{RlsbT}$ and the mirrored bit line current $I_{RmlsbT}$ (i.e., $I_{RmlsbT}$=RlsbT).

The true bit line BLT<1> for the more significant bit column of memory cells 14 in the array 12 is coupled, preferably directly connected, to the gate terminal and drain terminal of a p-channel MOS transistor M3. The source terminal of the transistor M3 is coupled, preferably directly connected, to a supply voltage Vdd node. The bit line BLT<1> is further coupled, preferably directly connected, to the gate terminal of a p-channel MOS transistor M4. The source terminal of the transistor M4 is coupled, preferably directly connected, to the supply voltage Vdd node. The drain terminal of transistor M4 is coupled, preferably directly connected, to the current summation node 103. The transistors M3 and M4 form a current mirroring circuit, and the transistors M3, M4 are sized to provide a 1:2 current mirroring ratio between the bit line current $I_{RmsbT}$ and the mirrored bit line current $I_{RmssbT}$ (i.e., $I_{RmmsbT}=2*I_{RmsbT}$).

More generally speaking, there is a weighted relationship between the current mirroring ratios of the current mirror connected transistors across the plurality of columns of memory cells storing multi-bit weight data. So, if a further bit line BLT<2> were involved, the current mirror connected transistors for that column, in accordance with the weighted relationship, may have a 1:4 current mirroring ratio.

The complement bit line BLC<0> for the less significant bit column of memory cells 14 in the array 12 is coupled, preferably directly connected, to the gate terminal and drain terminal of a p-channel MOS transistor M5. The source terminal of the transistor M5 is coupled, preferably directly connected, to a supply voltage Vdd node. The bit line BLC<0> is further coupled, preferably directly connected, to the gate terminal of a p-channel MOS transistor M6. The source terminal of the transistor M6 is coupled, preferably directly connected, to the supply voltage Vdd node. The drain terminal of transistor M6 is coupled, preferably directly connected, to the input of an n-channel MOS current mirror circuit formed by transistors Ma and Mb. An output of the n-channel MOS current mirror circuit is coupled, preferably directly connected, to the current summation node 103. The transistors M5 and M6 form a current mirroring circuit, and the transistors M5, M6 are sized to provide a 1:1 current mirroring ratio between the bit line current $I_{RlsbC}$ and the mirrored bit line current $I_{RmlsbC}$ (i.e., $I_{RmlsbC}=I_{RlsbC}$).

The complement bit line BLC<1> for the more significant bit column of memory cells 14 in the array 12 is coupled, preferably directly connected, to the gate terminal and drain terminal of a p-channel MOS transistor M7. The source terminal of the transistor M7 is coupled, preferably directly connected, to a supply voltage Vdd node. The bit line BLC<1> is further coupled, preferably directly connected, to the gate terminal of a p-channel MOS transistor M8. The source terminal of the transistor M8 is coupled, preferably directly connected, to the supply voltage Vdd node. The drain terminal of transistor M8 is coupled, preferably directly connected, to the input of an n-channel MOS current mirror circuit formed by transistors Mc and Md. An output of the n-channel MOS current mirror circuit is coupled, preferably directly connected, to the current summation node 103. The transistors M7 and M8 form a current mirroring circuit, and the transistors M7, M8 are sized to provide a 1:2 current mirroring ratio between the bit line current $I_{RmsbC}$ and the mirrored bit line current $I_{RmmsbC}$ (i.e., $I_{RmmsbC}=2*I_{RmsbCT}$).

More generally speaking, there is a weighted relationship between the current mirroring ratios of the current mirror connected transistors across the plurality of columns of memory cells storing multi-bit weight data. So, if a further bit line BLC<2> were involved, the current mirror connected transistors for that column, in accordance with the weighted relationship, may have a 1:4 current mirroring ratio.

At the current summing node 103, the sum of the mirrored complement read currents $I_{RmlsbC}$ and $I_{RmmsbC}$ is subtracted from the sum of the mirrored true read currents $I_{RmlsbT}$ and $I_{RmmsbT}$ to generate a resulting output read current $I_{Rout}$ (i.e., $I_{Rout} = I_{RmlsbT} + I_{RmmsbT} - I_{RmlsbC} - I_{RmmsbC}$).

The output read current $I_{Rout}$ from the current summing node 103 is coupled through a switch S1 to an intermediate node 102. The open/close state of the switch S1 is controlled by the logic state of an integration signal INT. An integration capacitor Cint has a first terminal coupled, preferably directly connected, to the intermediate node 102 and a second terminal coupled, preferably directly connected, to the reference voltage (for example, ground) node. The intermediate node 102 is further coupled through a switch S2 to the reference voltage node. The open/close state of the switch S2 is controlled by the logic state of a reset signal RST.

The switches S1, S2 each may be implemented, for example, using a MOS transistor gate controlled by the appropriate one of the control signals RST and INT.

Operation of the bit line read circuit 100 is as follows: At a beginning of a computation cycle for an in-memory compute operation, the reset signal RST is asserted to close the switch S2 and discharge the integration capacitor Cint. Simultaneous application of word line signals dependent on the received feature data is then made to plural rows of memory cells 14 in the SRAM array 12 for the in-memory compute operation and true read currents $I_{RlsbT}$ and $I_{RmsbT}$ develop on the true bit lines BLT and complement read currents read currents $I_{RlsbC}$ and $I_{RmsbC}$ develop on the complement bit lines BLC. The magnitudes of these read currents are a function of a sum of the currents $I_{CELL}$ sunk to ground by the memory cells 14 of the column which participate in the in-memory compute operation. The integration signal INT is asserted to close the switch S1 and begin the integration time period. The true read currents $I_{RlsbT}$ and $I_{RmsbT}$ are mirrored to generate the true mirrored read currents $I_{RmlsbT}$ and $I_{RmmsbT}$ which are summed at the current summation node 103. The complement read currents $I_{RlsbC}$ and $I_{RmsbC}$ are mirrored to generate the complement mirrored read currents $I_{RmlsbC}$ and $I_{RmmsbC}$ which are subtracted from the current summation node 103. The result is the generation of the output read current $I_{Rout}$. This current is applied to charge the integration capacitor Cint to generate the voltage Vout as a function of $I_{Rout} * t/C$, where t is the duration of the integration time period (when switch S1 is closed) and C is the capacitance of the integration capacitor Cint. When the integration time period expires, the integration signal INT is deasserted to open the switch S1. The voltage Vout across the integration capacitor Cint is then converted to the digital signal MACout by the ADC circuit 104.

Figure 10:
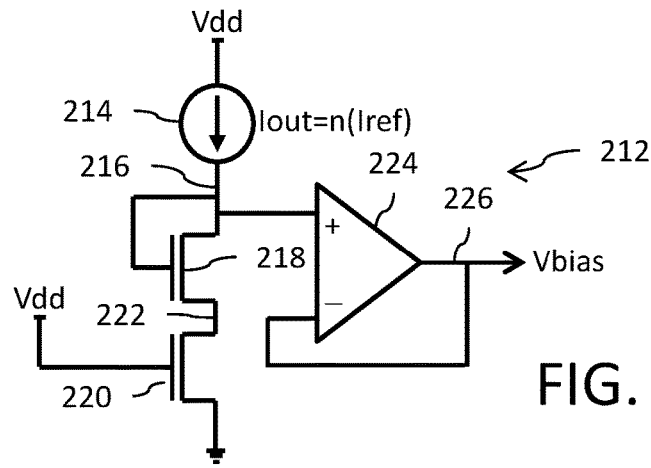
FIG. 10-11 are circuit diagrams for a bias voltage generator.

The implementations in FIGS. 4A, 4B, 5, 6, 7, 8, and 9 further utilize an adaptive supply voltage Vbias for word line driving. The supply voltage for the word line driver circuit 16 is not fixed equal to Vdd (i.e., it is not the same as the array supply voltage) or set with a fixed word line under voltage level (for example, $V_{WLUD}$=Vdd/2). Instead, the supply voltage for the word line driver circuit 16 is an adaptive supply voltage Vbias modulated dependent on integrated circuit process conditions. The voltage level of this adaptive supply voltage Vbias is less than the supply voltage Vdd and is generated by a voltage generator circuit 212 as shown in FIG. 10 with a voltage level that is proportional (by a factor of n) to a reference current Iref level. The reference current Iref has a magnitude defined by the fast n-channel MOS process lot. As an example, the reference current Iref for a given bit cell is the current where the multi row access write margin (MRAWM) is zero while allowing for full rail-to-rail swing of bit lines at the worst process corner. The value of n for the proportionality factor is set by design and is based on a desired variability of the adaptive supply voltage Vbias level (such that n numbers of replica will effectively minimize the variation of Vbias due to local variation).

The modulation of the supply voltage for the word line driver circuit 16 dependent on integrated circuit process conditions, in combination with the configuration of the current mirroring circuits for the read circuit coupled to each bit line serves to inhibit drop of a voltage on the bit line below a bit flip voltage during the simultaneous actuation of the plurality of word lines for the in-memory compute operation. The modulated supply voltage exercises control over the read current $I_{CELL}$ of the memory cells 14, and there is a corresponding control over the voltage on the bit line, with use of the sizing of the current sourcing transistor in the current mirroring circuits, to preclude voltage drops on the bit line below the write margin during simultaneous word line actuation. Advantageously, this configuration enables better linearity in the current mirror and supports use of a current mirroring circuit configuration which does not need a cascode structure.

The voltage generator circuit 212 includes a current source 214 powered from the supply voltage Vdd and generating an output current Iout at node 216 where the current source is connected in series with the series connection of a first n-channel MOS transisitor 218 and second n-channel MOS transistor 220. The output current Iout is applied (i.e., forced) to a circuit with transistors 218 and 220 to generate the bias voltage Vbias, wherein the transistors 218 and 220 effectively replicate the pass-gate and pull-down transistor configuration depicting the read condition of the memory cell 14. The first n-channel MOS transistor 218 has a drain coupled (preferably directly connected) to node 216 and a source coupled (preferably directly connected) to node 222. A gate of the first n-channel MOS transistor 218 is coupled (preferably directly connected) to the drain at node 216, thus configuring transistor 218 as a diode-connected device. The first n-channel MOS transistor 218 is a scaled replica of the n-channel transfer (passgate) transistors 26 and 28 within each memory cell 14, where the scaling factor is equal to n. In this context, "scaled replica" means that the transistor 218 is made identically using the same integrated circuit process materials and parameters (doping levels, oxide thickness, gate materials, etc.) as each of the transistors 26 and 28 but is an n times repetition of the single transistor providing an effectively larger width. As an example, the transistor 218 may be fabricated by connecting n transistors in parallel which are identical (matching) to each of the transistors 26 and 28. The second n-channel MOS transistor 220 has a drain coupled (preferably directly connected) to node 222 and a source coupled (preferably directly connected) to the ground supply reference. A gate of the second n-channel MOS transistor 220 is coupled (preferably directly connected) to receive the supply voltage Vdd. The second n-channel MOS transistor 220 is a scaled replica of the n-channel pulldown transistors 34 and 36 within each memory cell 14, where the scaling factor is equal to n. As an example, the transistor 220 may be fabricated by connecting n transistors in parallel which are identical (matching) to each of the transistors 34 and 36.

The bias voltage Vbias generated at node 216 is equal to:

$$Vbias = n(Iref)(Rdson218 + Rdson220),$$

where: Rdson218 is the resistance from drain to source of the diode-connected first n-channel MOS transistor 218, and Rdson220 is the resistance from drain to source of the second n-channel MOS transistor 220 gate biased by supply voltage Vdd. The series connected transistors 218 and 220 replicate, subject to the scaling factor n, the current path in the memory cell 14 from the bit line (BLT or BLC) to ground in the operating condition where the pass gate transistor and its pull down transistor on one side of the memory cell are both turned on during the read operation.

A differential amplifier circuit 224 configured as a unity gain voltage follower receives the Vbias voltage at its non-inverting input and generates the Vbias voltage at its output 226 with sufficient drive capacity to power all of the word line driver circuits 16 for the simultaneously actuated word lines during an in-memory compute operation. The output of the differential amplifier circuit 224 is shorted to the inverting input.

Figure 11:
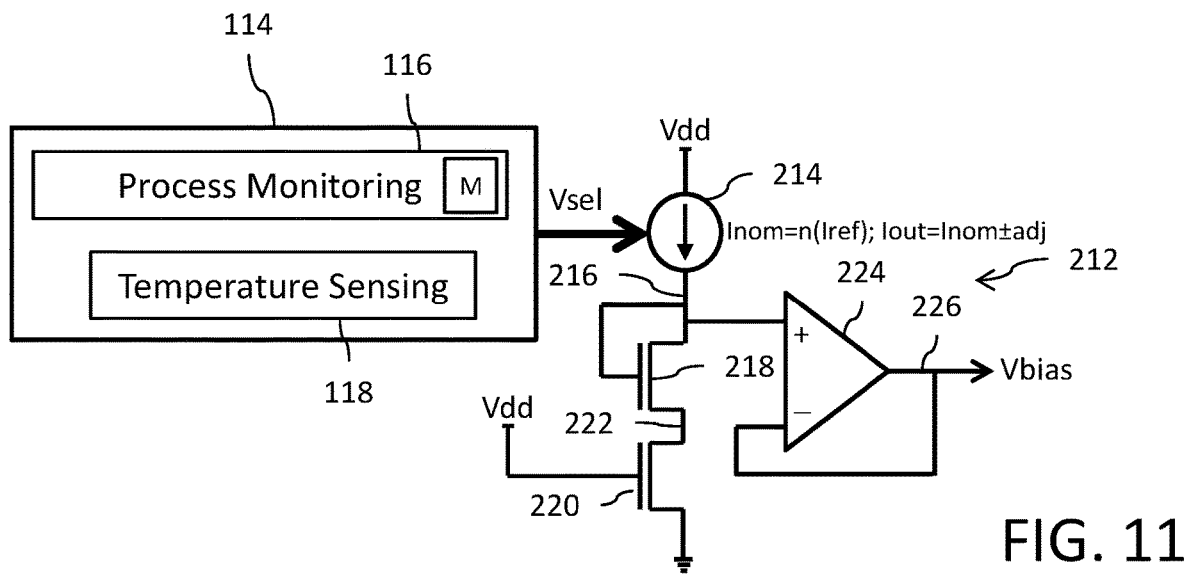

Reference is now made to FIG. 11 which shows a schematic diagram of an alternate embodiment for the voltage generator circuit 212. The voltage generator circuit 212 in FIG. 11 differs from the implementation shown in FIG. 10 in that a further integrated circuit process and/or temperature based tuning of the magnitude of the current Iout output by the current source 214 within the voltage generator circuit 212 is supported. In this context, the current source 214 is formed by a variable current source having a base (or nominal) current Inom magnitude equal to n(Iref) with a positive or negative adjustment adj from that base current magnitude level set by a control signal. In other words, the magnitude of the current output Iout by the current source 214 is equal to n(Iref)±adj, where adj is the adjustment set by the control signal. In an embodiment, the control signal is a multi-bit digital control signal Vsel, but it will be understood that the control signal can instead be implemented as an analog signal. The value of the control signal (in particular, the digital values of the bits of the control signal Vsel) selects the degree of adjustment made to the magnitude of the current output by the current source 214. The control signal Vsel is generated by a control circuit 114 in response to integrated circuit process and/or temperature information. Thus, the level of the adaptive supply voltage Vbias is now additionally dependent on that integrated circuit process and/or temperature information.

The integrated circuit process information is a digital code generated and stored in a memory M within the control circuit 114. The digital code represents the centering of the process lot and is generated by circuitry such as, for example, ring oscillators (RO) whose output frequency varies dependent on integrated circuit process. The output frequencies of the RO circuits thus represent the process centering and can easily be converted into a digital code (for example, through the use of counter circuits). A process monitoring circuit 116 within the control circuit 114 can generate the value of the control signal Vsel as a function of the stored digital code for the integrated circuit process. For example, the process monitoring circuit 116 may include a look-up table (LUT) that correlates each digital code with a value of the control signal Vsel for selecting the positive or negative adjustment adj of the nominal magnitude of the current generated by the current source 214 to ensure that the voltage level of the adaptive supply voltage Vbias will produce the optimal level of word line underdrive for the integrated circuit process corner. The control circuit 114 outputs the value of the control signal Vsel correlated to the digital code and the voltage generator circuit 212 responds by generating the corresponding voltage level for the adaptive supply voltage Vbias.

The temperature information is generated by a temperature sensing circuit 118 and represents a current temperature of the integrated circuit. The temperature sensing circuit 118 may modify or adjust the value of the control signal Vsel as a function of the sensed temperature. For example, the temperature sensing circuit 118 may include a look-up table (LUT) that specifies a certain adjustment in the value of the control signal Vsel for providing a corresponding tuning of the magnitude of the current output by the current source 214 to ensure that the level of the adaptive supply voltage Vbias will produce the optimal level of word line underdrive given the integrated circuit process corner and current temperature condition.

Figure 12:
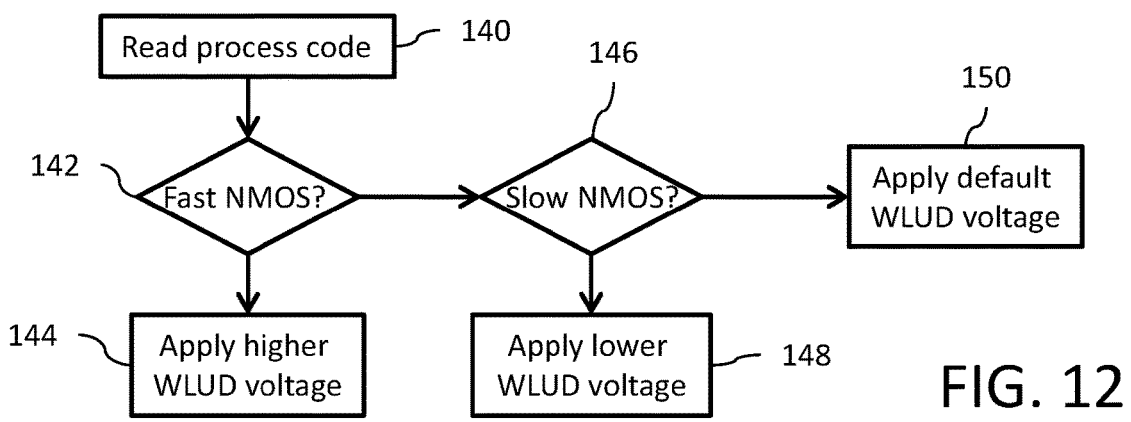
FIG. 12 shows a flow diagram for operation of the circuit shown in FIG. 11.

Reference is now made to FIG. 12 which shows a flow diagram for operation of the control circuit 114 and process monitoring circuit 116 for the circuit of FIG. 11. In step 140, the stored digital code for the integrated circuit process is read from the memory M. In an embodiment, the digital code for the integrated circuit process is loaded at the factory into the memory M, and this digital code is based on the identified integrated circuit process characteristic (fast/slow corner, etc.) for the integrated circuit fabrication lot (for example, the source wafer) from which the integrated circuit is obtained. Next, in step 142, a determination is made as to whether the read digital code for the integrated circuit process indicates that the n-channel MOS transistors of the memory cells 12 are at the fast integrated circuit process corner (i.e., where and n-channel MOS speed is fast and p-channel MOS speed is slow—the "FS" corner). If yes, then a value of the control signal Vsel is selected in step 144 which corresponds to the read digital code and which will cause a negative adjustment adj in the magnitude of the current output by the current source 214 so that the voltage regulator circuit 212 will produce a higher degree of word line underdrive (i.e., the level for the adaptive supply voltage Vbias will be lower than a nominal (or default) level for word line underdrive set by the nominal current magnitude n(Iref)). The effect of setting the adaptive supply voltage Vbias to a voltage level that is lower than the nominal (or default) voltage level is to reduce the MRAWM which is the maximum level of the bit-line voltage needed to write into bit-cell. Reducing the MRAWM results in degradation of the write-ability of the bit cell and improvement of the data flip rate which are of concern at the fast n-channel MOS corners. This lower than nominal (or default) voltage level also enables a higher headroom for bit line swing, and as a result there is a higher precision for the bit line accumulation value in the in-memory compute operation. If no in step 142, then in step 146 a determination is made as to whether the read digital code for the integrated circuit process indicates that the n-channel MOS transistors of the memory cells 12 are at the slow integrated circuit process corner (i.e., where n-channel MOS speed is slow and p-channel MOS speed is fast—the "SF" corner). If yes, then a value of the control signal Vsel is selected in step 148 which corresponds to the read digital code and which will cause a positive adjustment adj in the magnitude of the current output by the current source 214 so that the voltage regulator circuit 212 will produce a lower degree of word line underdrive (i.e., the level for the adaptive supply voltage Vbias is higher than the nominal (or default) level for word line underdrive set by the nominal current magnitude n(Iref)). The effect of setting the adaptive supply voltage Vbias to a voltage level that is higher than the nominal (or default) voltage level is to increase the multi row access write margin (MRAWM), resulting in an improved cell current while still controlling the data flip rate which is of less concern at slow NMOS corners. This higher than nominal (or default) voltage level also reduces the local variation effect of the slow process corner. If no in step 146, then in step 150 a value of the control signal Vsel is selected which corresponds to the read digital code and which will cause no adjustment (i.e., adj=0) in the n(Iref) magnitude of the current output by the current source 214 so that the voltage regulator circuit 212 will produce a level for the adaptive supply voltage Vbias that is equal to the nominal (or default) level for word line underdrive as set by the nominal current Inom.

Although the process of FIG. 12 contemplates three levels of voltage control (higher than, lower than, and equal to, nominal), it will be understood that this is by example only. Additional testing steps may be added to the process of FIG. 12 to test for other integrated circuit process corner or process-related conditions (for example, fast-fast (FF) and/or slow-slow (SS) corners), with each test having an associated digital code and value of the control signal Vsel for setting a corresponding level of the adjustment for the current output by the current source 214 of the voltage generator circuit 212.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An in-memory computation circuit, comprising:
a memory array including a plurality of memory cells arranged in a matrix with plural rows and plural columns, each row including a word line connected to the memory cells of the row, and each column including a first bit line connected to the memory cells of the column;
a word line driver circuit for each row having an output connected to drive the word line of the row, wherein the word line driver circuit has a power supply node connected to receive an adaptive supply voltage having a voltage level that is modulated dependent on integrated circuit process and/or temperature conditions;
a row controller circuit configured to simultaneously actuate the plurality of word lines by applying pulses through the word line driver circuits to the word lines for an in-memory compute operation; and
a column processing circuit including a first read circuit coupled to each first bit line, wherein each first read circuit comprises:
a first current mirroring circuit configured to mirror a first read current on the first bit line to generate a first mirrored read current; and
a first integration capacitor configured to integrate the first mirrored read current to generate a first output voltage;
wherein the adaptive supply voltage and configuration of the first current mirroring circuit inhibits drop of a voltage on the first bit line below a bit flip voltage during the simultaneous actuation of the plurality of word lines for the in-memory compute operation.

2. The circuit of claim 1, wherein said column processing circuit further comprises an analog-to-digital converter (ADC) circuit configured to convert the first output voltage to a digital output.

3. The circuit of claim 1, wherein said first current mirroring circuit is switchably controlled to output the first mirrored read current in response to assertion of an integration control signal during the in-memory compute operation.

4. The circuit of claim 1, wherein said first integration capacitor is discharged in response to assertion of a reset control signal at a beginning of the in-memory compute operation.

5. The circuit of claim 1, wherein each memory cell of the memory array is an SRAM cell that is one of a 6T-type or 8T-type memory cell.

6. An in-memory computation circuit, comprising:
a memory array including a plurality of memory cells arranged in a matrix with plural rows and plural columns, each row including a word line connected to the memory cells of the row, and each column including a first bit line connected to the memory cells of the column;
a word line driver circuit for each row having an output connected to drive the word line of the row, wherein the word line driver circuit is powered by an adaptive supply voltage dependent on integrated circuit process and/or temperature conditions;
a row controller circuit configured to simultaneously actuate the plurality of word lines by applying pulses through the word line driver circuits to the word lines for an in-memory compute operation; and
a column processing circuit including a first read circuit coupled to each first bit line, wherein each first read circuit comprises:
a first current mirroring circuit configured to mirror a first read current on the first bit line to generate a first mirrored read current; and
a first integration capacitor configured to integrate the first mirrored read current to generate a first output voltage;
wherein the adaptive supply voltage and configuration of the first current mirroring circuit inhibits drop of a voltage on the first bit line below a bit flip voltage during the simultaneous actuation of the plurality of word lines for the in-memory compute operation; and
a voltage generator circuit configured to generate the adaptive supply voltage which is dependent on integrated circuit process and/or temperature conditions, said voltage generator circuit comprising:
a current source configured to generate a current applied to a first node; and
a series connection of a first transistor and second transistor between the first node and a reference node;
wherein the adaptive supply voltage is generated at said first node;
wherein the first transistor is a replica of a passgate transistor within the memory cell;
wherein the second transistor is a replica of a pull down transistor within the memory cell.

7. The circuit of claim 6, wherein:
the current generated by the current source has a magnitude set as a function of a reference current representative of current flowing through the passgate transistor and the pull down transistor for an applicable integrated circuit process corner; and the magnitude of the current generated by the current source is scaled by a factor applied to the reference current;

wherein the first transistor is scaled by said factor for the replica of the passgate transistor; and wherein the second transistor is scaled by said factor for the replica of the pull down transistor.

8. The circuit of claim 6, further comprising an amplifier circuit having an input coupled to said first node and an output coupled to power the word line driver circuits.

9. The circuit of claim 6, wherein the current source is controlled to generate an adjustment to the current, and further comprising a control circuit configured to generate a control signal for application to the current source for modulating a level of the current away from a nominal level in response to an applicable integrated circuit process corner for transistor devices of the memory cells.

10. The circuit of claim 9, wherein the applicable integrated circuit process corner is indicated by a programmed code stored in the control circuit.

11. The circuit of claim 10, wherein the control circuit includes a lookup table (LUT) correlating the programmed code to a value of the control signal.

12. The circuit of claim 9, wherein the control circuit further comprises a temperature sensor, and wherein the control signal is configured to cause a temperature dependent tuning of the level of the current set in response to applicable integrated circuit process corner.

13. The circuit of claim 12, wherein the control circuit includes a lookup table (LUT) correlating sensed integrated circuit temperature to a tuning level for the value of the control signal.

14. The circuit of claim 6, wherein said column processing circuit further comprises an analog-to-digital converter (ADC) circuit configured to convert the first output voltage to a digital output.

15. The circuit of claim 6, wherein said first current mirroring circuit is switchably controlled to output the first mirrored read current in response to assertion of an integration control signal during the in-memory compute operation.

16. The circuit of claim 6, wherein said first integration capacitor is discharged in response to assertion of a reset control signal at a beginning of the in-memory compute operation.

17. The circuit of claim 6, wherein each memory cell of the memory array is an SRAM cell that is one of a 6T-type or 8T-type memory cell.

18. The circuit of claim 6, wherein the adaptive supply voltage has a voltage level that is modulated dependent on integrated circuit process and/or temperature conditions.

19. An in-memory computation circuit, comprising:

a memory array including a plurality of memory cells arranged in a matrix with plural rows and plural columns, each row including a word line connected to the memory cells of the row, and each column including a first bit line connected to the memory cells of the column;

a word line driver circuit for each row having an output connected to drive the word line of the row, wherein the word line driver circuit is powered by an adaptive supply voltage dependent on integrated circuit process and/or temperature conditions;

a row controller circuit configured to simultaneously actuate the plurality of word lines by applying pulses through the word line driver circuits to the word lines for an in-memory compute operation; and a column processing circuit including a first read circuit coupled to each first bit line, wherein each first read circuit comprises:

a first current mirroring circuit configured to mirror a first read current on the first bit line to generate a first mirrored read current; and a first integration capacitor configured to integrate the first mirrored read current to generate a first output voltage;

wherein the adaptive supply voltage and configuration of the first current mirroring circuit inhibits drop of a voltage on the first bit line below a bit flip voltage during the simultaneous actuation of the plurality of word lines for the in-memory compute operation;

wherein the first current mirroring circuit comprises:

a first MOS transistor having a drain and gate directly connected to the first bit line to receive the first read current; and a second MOS transistor having a gate directly connected to the gate of the first MOS transistor and a drain configured to output the first mirrored read current;

wherein said first MOS transistor is sized to conduct the first read current without the voltage on the first bit line dropping below the bit flip voltage during the simultaneous actuation of the plurality of word lines.

20. The circuit of claim 19, wherein said column processing circuit further comprises an analog-to-digital converter (ADC) circuit configured to convert the first output voltage to a digital output.

21. The circuit of claim 19, wherein said first current mirroring circuit is switchably controlled to output the first mirrored read current in response to assertion of an integration control signal during the in-memory compute operation.

22. The circuit of claim 19, wherein said first integration capacitor is discharged in response to assertion of a reset control signal at a beginning of the in-memory compute operation.

23. The circuit of claim 19, wherein each memory cell of the memory array is an SRAM cell that is one of a 6T-type or 8T-type memory cell.

24. The circuit of claim 19, wherein the adaptive supply voltage has a voltage level that is modulated dependent on integrated circuit process and/or temperature conditions.

25. An in-memory computation circuit, comprising:

a memory array including a plurality of memory cells arranged in a matrix with plural rows and plural columns, each row including a word line connected to the memory cells of the row, and each column including a first bit line connected to the memory cells of the column;

a word line driver circuit for each row having an output connected to drive the word line of the row, wherein the word line driver circuit is powered by an adaptive supply voltage dependent on integrated circuit process and/or temperature conditions;

a row controller circuit configured to simultaneously actuate the plurality of word lines by applying pulses through the word line driver circuits to the word lines for an in-memory compute operation; and a column processing circuit including a first read circuit coupled to each first bit line, wherein each first read circuit comprises:

a first current mirroring circuit configured to mirror a first read current on the first bit line to generate a first mirrored read current; and a first integration capacitor configured to integrate the first mirrored read current to generate a first output voltage;

wherein the adaptive supply voltage and configuration of the first current mirroring circuit inhibits drop of a voltage on the first bit line below a bit flip voltage during the simultaneous actuation of the plurality of word lines for the in-memory compute operation;

wherein each column further includes a second bit line connected to the memory cells of the column, and wherein the column processing circuit further includes a second read circuit coupled to each second bit line, wherein each second read circuit comprises:

a second current mirroring circuit configured to mirror a second read current on the second bit line to generate a second mirrored read current; and a second integration capacitor configured to integrate the second mirrored read current to generate a second output voltage;

wherein the adaptive supply voltage and configuration of the second current mirroring circuit inhibits drop of a voltage on the second bit line below the bit flip voltage during the simultaneous actuation of the plurality of word lines for the in-memory compute operation.

26. The circuit of claim 25, wherein said column processing circuit further comprises an analog-to-digital converter (ADC) circuit configured to convert a difference between the first and second output voltages to a digital output.

27. The circuit of claim 25, wherein the second current mirroring circuit comprises:

a first MOS transistor having a drain and gate directly connected to the second bit line to receive the second read current; and a second MOS transistor having a gate directly connected to the gate of the first MOS transistor and a drain configured to output the second mirrored read current;

wherein said first MOS transistor is sized to conduct the second read current without the voltage on the second bit line dropping below the bit flip voltage during the simultaneous actuation of the plurality of word lines.

28. The circuit of claim 25, wherein said first and second current mirroring circuits are switchably controlled to output the first and second mirrored read currents, respectively, in response to assertion of an integration control signal during the in-memory compute operation.

29. The circuit of claim 25, wherein said first and second integration capacitors are discharged in response to assertion of a reset control signal at a beginning of the in-memory compute operation.

30. The circuit of claim 25, wherein said first current mirroring circuit is switchably controlled to output the first mirrored read current in response to assertion of an integration control signal during the in-memory compute operation.

31. The circuit of claim 25, wherein said first integration capacitor is discharged in response to assertion of a reset control signal at a beginning of the in-memory compute operation.

32. The circuit of claim 25, wherein each memory cell of the memory array is an SRAM cell that is one of a 6T-type or 8T-type memory cell.

33. The circuit of claim 25, wherein the adaptive supply voltage has a voltage level that is modulated dependent on integrated circuit process and/or temperature conditions.

34. An in-memory computation circuit, comprising:

a memory array including a plurality of memory cells arranged in a matrix with plural rows and plural columns, each row including a word line connected to the memory cells of the row, and each column including a first bit line connected to the memory cells of the column;

a word line driver circuit for each row having an output connected to drive the word line of the row, wherein the word line driver circuit is powered by an adaptive supply voltage dependent on integrated circuit process and/or temperature conditions;

a row controller circuit configured to simultaneously actuate the plurality of word lines by applying pulses through the word line driver circuits to the word lines for an in-memory compute operation; and a column processing circuit including a first read circuit coupled to each first bit line, wherein each first read circuit comprises:

a first current mirroring circuit configured to mirror a first read current on the first bit line to generate a first mirrored read current; and a first integration capacitor configured to integrate the first mirrored read current to generate a first output voltage;

wherein the adaptive supply voltage and configuration of the first current mirroring circuit inhibits drop of a voltage on the first bit line below a bit flip voltage during the simultaneous actuation of the plurality of word lines for the in-memory compute operation;

wherein each column further includes a second bit line connected to the memory cells of the column, and wherein the column processing circuit further includes a second read circuit coupled to each second bit line, wherein each second read circuit comprises:

a second current mirroring circuit configured to mirror a second read current on the second bit line to generate a second mirrored read current;

wherein said first integration capacitor configured to integrate a difference between the first and second mirrored read currents to generate the first output voltage;

wherein the adaptive supply voltage and configuration of the second current mirroring circuit inhibits drop of a voltage on the second bit line below the bit flip voltage during the simultaneous actuation of the plurality of word lines for the in-memory compute operation.

35. The circuit of claim 34, wherein said column processing circuit further comprises an analog-to-digital converter (ADC) circuit configured to convert the first output voltage to a digital output.

36. The circuit of claim 34, wherein the second current mirroring circuit comprises:

a first MOS transistor having a drain and gate directly connected to the second bit line to receive the second read current; and a second MOS transistor having a gate directly connected to the gate of the first MOS transistor and a drain configured to output the second mirrored read current;

wherein said first MOS transistor is sized to conduct the second read current without the voltage on the second bit line dropping below the bit flip voltage during the simultaneous actuation of the plurality of word lines.

37. The circuit of claim 34, wherein said first and second current mirroring circuits are switchably controlled to output the first and second mirrored read currents, respectively, in response to assertion of an integration control signal during the in-memory compute operation.

38. The circuit of claim 34, wherein said first integration capacitor is discharged in response to assertion of a reset control signal at a beginning of the in-memory compute operation.

39. The circuit of claim 34, wherein said first current mirroring circuit is switchably controlled to output the first mirrored read current in response to assertion of an integration control signal during the in-memory compute operation.

40. The circuit of claim 34, wherein said first integration capacitor is discharged in response to assertion of a reset control signal at a beginning of the in-memory compute operation.

41. The circuit of claim 34, wherein each memory cell of the memory array is an SRAM cell that is one of a 6T-type or 8T-type memory cell.

42. The circuit of claim 34, wherein the adaptive supply voltage has a voltage level that is modulated dependent on integrated circuit process and/or temperature conditions.

* * * * *